US00RE38645E1

(19) United States
(12) Reissued Patent
O'Sullivan

(10) Patent Number: US RE38,645 E
(45) Date of Reissued Patent: Nov. 2, 2004

(54) PORTABLE HYBRID COMMUNICATION SYSTEM AND METHODS

(75) Inventor: Harry M. O'Sullivan, Red Oak, TX (US)

(73) Assignee: MLR, LLC, Palm Beach Gardens, FL (US)

(21) Appl. No.: 10/141,880

(22) Filed: May 10, 2002

Related U.S. Patent Documents

Reissue of:
(64) Patent No.: 4,972,457
Issued: Nov. 20, 1990
Appl. No.: 07/301,521
Filed: Jan. 19, 1989

U.S. Applications:
(62) Division of application No. 07/831,671, filed on Feb. 5, 1992.

(51) Int. Cl.[7] ..... H04M 1/00

(52) U.S. Cl. ..... 455/556.1; 455/557; 455/567; 455/566; 455/550.1; 455/418; 455/558; 455/569.1

(58) Field of Search ..... 455/90, 556, 557, 455/575, 550, 90.1–90.3, 556.1, 575.1–575.9, 553.1, 552.1, 550.1, 569.1, 558, 418, 566, 567; 379/93.28, 93.31, 93.32

(56) References Cited

U.S. PATENT DOCUMENTS

| | | | |
|---|---|---|---|
| 3,613,004 | A | 10/1971 | Wycoff |
| 3,657,700 | A | 4/1972 | Lutzker |
| 3,674,935 | A | 7/1972 | Lawrence |
| 3,711,777 | A | 1/1973 | Tink |
| 3,714,586 | A | 1/1973 | Mason |
| 3,714,650 | A | 1/1973 | Fuller et al. |

(List continued on next page.)

FOREIGN PATENT DOCUMENTS

| | | |
|---|---|---|
| DE | 3433900 | 3/1986 |
| EP | 0295146 | 6/1988 |

(List continued on next page.)

OTHER PUBLICATIONS

Shikli, Peter, "Solving Data Communications Problems With The Cellular Network," PICO, Jan. 1988, pp. 14–17.

(List continued on next page.)

*Primary Examiner*—Nay Maung
*Assistant Examiner*—Tanmay Lele
(74) *Attorney, Agent, or Firm*—Charles M. Leedom, Jr.

(57) ABSTRACT

A laptop device includes a personal computer, a cellular transceiver, a speakerphone, and a hybrid communications control unit. The device has connectors for attaching a headset, cellular control unit, land telephone line, and additional speakers and microphones. The microprocessor-controlled hybrid communications control unit includes a modem, a data access arrangement, and a tone generator as well as digital, analog, and power switches. The hybrid communications control unit switches the communications components and provides, under program control, the proper protocols, level, and impedance matching to connect the modem, speakerphone, headset, speaker/microphone, or cellular control unit to the landline or to the cellular network via the transceiver. Matching and switching operations are automatic and transparent to the user. The unit can also connect two of the terminal devices or connect the cellular and landlines for call relaying. The device is capable of connecting plural calls at the same time. The hybrid communications control unit may be controlled by its internal firmware, by toggle switches, or by commands issued from the personal computer. Microfiche Appendix Included (1 Microfiche, 79 pages).

37 Claims, 10 Drawing Sheets

Microfiche Appendix Included
(1 Microfiche, 79 Pages)

U.S. PATENT DOCUMENTS

| | | | | |
|---|---|---|---|---|
| 3,745,251 | A | | 7/1973 | Fretwell |
| 3,766,479 | A | | 10/1973 | Thalimer et al. |
| 3,851,112 | A | | 11/1974 | Kusan |
| 3,878,333 | A | | 4/1975 | Shimizu et al. |
| 3,899,772 | A | | 8/1975 | Mead et al. |
| 3,927,259 | A | | 12/1975 | Brown |
| 3,939,431 | A | | 2/1976 | Cohlman |
| 3,974,343 | A | | 8/1976 | Cheney |
| 4,012,596 | A | | 3/1977 | West, Jr. et al. |
| 4,025,853 | A | | 5/1977 | Addeo |
| 4,094,484 | A | | 6/1978 | Galione |
| 4,109,283 | A | | 8/1978 | Rast |
| 4,178,476 | A | | 12/1979 | Frost |
| 4,284,849 | A | | 8/1981 | Anderson et al. |
| 4,330,862 | A | | 5/1982 | Smolik |
| 4,337,376 | A | | 6/1982 | Gruenberg |
| 4,376,310 | A | | 3/1983 | Stackhouse et al. |
| 4,403,322 | A | | 9/1983 | Kato et al. |
| 4,414,661 | A | | 11/1983 | Karlstrom |
| 4,415,774 | A | | 11/1983 | Driver |
| 4,419,756 | A | | 12/1983 | Cheng-Quispe et al. |
| 4,425,665 | A | | 1/1984 | Stauffer |
| 4,434,461 | A | | 2/1984 | Puhl |
| 4,486,624 | A | * | 12/1984 | Puhl et al. ..... 179/2 |
| 4,488,002 | A | | 12/1984 | Seibel |
| 4,498,173 | A | | 2/1985 | Reudink |
| 4,503,288 | A | | 3/1985 | Kessler |
| 4,519,068 | A | | 5/1985 | Krebs et al. |
| 4,524,244 | A | | 6/1985 | Faggin et al. |
| 4,525,861 | A | | 7/1985 | Freeburg |
| 4,545,071 | A | | 10/1985 | Freeburg |
| 4,549,308 | A | | 10/1985 | LoPinto |
| 4,556,760 | A | | 12/1985 | Goldman |
| 4,558,178 | A | | 12/1985 | Yasuda et al. |
| 4,562,572 | A | | 12/1985 | Goldman et al. |
| 4,568,800 | A | | 2/1986 | Orikasa |
| 4,577,182 | A | | 3/1986 | Millsap et al. |
| 4,578,537 | A | | 3/1986 | Faggin et al. |
| 4,578,796 | A | | 3/1986 | Charalambous et al. |
| 4,591,661 | A | | 5/1986 | Benedetto et al. |
| 4,637,022 | A | | 1/1987 | Burke et al. |
| 4,654,867 | A | * | 3/1987 | Labedz et al. ..... 379/59 |
| 4,656,318 | A | | 4/1987 | Noyes |
| 4,658,096 | A | | 4/1987 | West, Jr. et al. |
| 4,660,218 | A | | 4/1987 | Hashimoto |
| 4,661,659 | A | | 4/1987 | Nishimura |
| 4,667,653 | A | | 5/1987 | Cornell |
| 4,677,656 | A | | 6/1987 | Burke et al. |
| 4,680,787 | A | | 7/1987 | Marry |
| 4,685,123 | A | | 8/1987 | Hsia |
| 4,691,314 | A | | 9/1987 | Bergins et al. |
| 4,694,473 | A | | 9/1987 | Etoh |
| 4,697,281 | A | | 9/1987 | O'Sullivan |
| 4,698,839 | A | | 10/1987 | DeVaney et al. |
| 4,718,080 | A | | 1/1988 | Serrano et al. |
| 4,737,975 | A | * | 4/1988 | Shafer ..... 379/58 |
| 4,751,725 | A | | 6/1988 | Bonta et al. |
| 4,752,949 | A | | 6/1988 | Steinbeck et al. |
| 4,759,059 | A | | 7/1988 | Christensen |
| 4,775,997 | A | | 10/1988 | West, Jr. et al. |
| 4,823,362 | A | | 4/1989 | Etoh |
| 4,823,373 | A | | 4/1989 | Takahashi et al. |
| 4,837,800 | A | | 6/1989 | Freeburg et al. |
| 4,837,812 | A | | 6/1989 | Takahashi et al. |
| 4,852,146 | A | | 7/1989 | Hathcock et al. |
| 4,868,859 | A | | 9/1989 | Sheffer |
| 4,868,863 | A | | 9/1989 | Hartley et al. |
| 4,887,290 | A | | 12/1989 | Dop et al. |
| 4,890,315 | A | | 12/1989 | Bendixen et al. |
| 4,912,756 | A | | 3/1990 | Hop |
| 4,922,517 | A | | 5/1990 | West, Jr. |
| 4,955,083 | A | | 9/1990 | Phillips et al. |
| 4,972,457 | A | | 11/1990 | O'Sullivan |
| 4,972,462 | A | | 11/1990 | Shibata |
| 4,989,230 | A | * | 1/1991 | Gillig et al. ..... 379/59 |
| 4,991,197 | A | | 2/1991 | Morris |
| 5,025,254 | A | | 6/1991 | Hess |
| 5,046,082 | A | | 9/1991 | Zicker et al. |
| 5,073,921 | A | | 12/1991 | Nomura et al. |
| 5,081,673 | A | | 1/1992 | Engelke et al. |
| 5,095,534 | A | | 3/1992 | Hiyama |
| 5,127,041 | A | | 6/1992 | O'Sullivan |
| 5,127,042 | A | | 6/1992 | Gillig |
| 5,131,019 | A | | 7/1992 | Sheffer et al. |
| 5,134,648 | A | | 7/1992 | Hochfield et al. |
| RE34,034 | E | | 8/1992 | O'Sullivan |
| 5,170,470 | A | | 12/1992 | Pindar et al. |
| 5,202,963 | A | | 4/1993 | Zelley |
| 5,249,218 | A | | 9/1993 | Sainton |
| 5,353,334 | A | | 10/1994 | O'Sullivan |
| 5,367,563 | A | | 11/1994 | Sainton |

FOREIGN PATENT DOCUMENTS

| | | |
|---|---|---|
| EP | 0309627 | 4/1989 |
| GB | 2170977 | 2/1986 |
| GB | 2256113 | 11/1992 |
| WO | 8700718 | 1/1987 |
| WO | 8804362 | 12/1988 |
| WO | 8905553 | 6/1989 |
| WO | 8600207 | 7/1989 |
| WO | 8903710 | 8/1989 |
| WO | WO 90/13211 | 1/1990 |
| WO | 9003076 | 3/1990 |
| WO | 9107044 | 5/1991 |
| WO | 9210047 | 6/1992 |

OTHER PUBLICATIONS

"CP 1157 Handheld Portable Unit," manufactured in USA by E.F. Johnson Company for Millicom, Inc.* *FIG. 1–4, pp. 1.5, 2.6, 2.18, 2.19, 2.20, 2.21, 6.11, 6.12 and 6.13.

Mobile Data Report, "Borland's Sidekick 2.0 to Dispatch Pages, Toshiba Debuts Cellular Modem at Comdex", Nov. 19, 1990, vol. 3, No. 5, pp. 1–4, ISSN 1040–7022.

M. Kramer, "Cellular modems in Need of Industry Standard; New Modem Technology", Sep. 17, 1990, PC Week, vol. 7, No. 37, pp. 129–131.

S. Lilly, "Cellular Modems Show Wide Promise, Narrow Use", Jan. 7, 1986, PC Week, vol. 3, pp. 132–134.

Mobile Data Report, "NEC Introduces Laptop, Phone, RJ–11 Briefcase", Oct. 22, 1990, pp. 4–5.

C. O'Malley, "Connection, Dialing for Data Over the Airwaves", 44–51, Nov. 1990.

U.S. Trademark 1,366,435, registered Oct. 1985.

"A Tale of Two Modems", F.R. Derfler, Jr., Aug. 21, 1984, PC Magazine.

"Advanced Mobile PhoneService: Control Architecture", Z.C. Fluhr & P.T. Porter, Bell System Technical Journal, vol. 58, No. 1, Jan. 1979.

"Advanced Mobile Phone Service: A Subscriber Set For the Equipment Test," R.E. Fisher, Bell System Technical Jouranl, vol. 58, No. 1, Jan. 1979.

"Advanced Mobile PhoneService," F.H. Blecher, IEEE Transaction on Vehicular Technology, VT 29, No. 2, May 1980.

"An 800Mhz Approach to Underground Data Communications," T.M. Caridi and P. Mighdoll, IEEE 1981 Industry Applications.

"ARQ Schemes for Data Transmission in Mobile Radio Systems," R.A. Comroe and J. Costello, Jr., IEEE Transaction on Vehicular Technology, vol. VT–33, Aug. 1984.
"AT&T 208A Data Set Product," Jul. 1975, Circuit Description, DC–1D232–01.
AT&T's Dimension PBX described in AT&T publication Bell System Practice Section 503–100–103, Issue 3, published Mar. 1981, which relates to a multi–button electronic telephone set.
Barker and Nadeau, Byte, Oct. 1985. p. 396.
Bell Bruno, Personal Computing, Jun. 1989, p. 40.
Bush, Data Communication, Oct. 1986, p. 74.
"Celldata Launched", British Telecom Journal, No. 3 (1985), vol. 6, Autumn.
"Cellnet Adds Data To Cellular Service," Internaltional News Telepone Engineer and Management, Nov. 1, 1985.
"Cellular Link is Step to Portable Office," Electronic, Jun. 28, 1984, pp. 48 and 50.
COMPAQ, "SpeedPAQ 144 Modem—Reference Guide".
COMPAQ, "COMPAQ Product Quality Statements".
COMPAQ, "SpeedPAQ 144 Modem—COMPAQ Portable Computers Installation Guide".
COMPAQ, "A COMPAQ and 121/PT128 Data Application . . . ", dated Jan. 25, 1993.
COMPAQ, "SpeedPAQ 144 Modem—Quick Reference".
COMPAQ, "SpeedPAQ 144 Modem—About Your Fax Software . . . ".
Computer & Software News, Nov. 14, 1988.
Computerworld, Apr. 25, 1988, p. 60.
"Dialing Data Via Mobile Telephones", Ira Brodsky, pp. 103–1 , 119, Data Communications International, Oct. 1989.
"Data Signaling Functions for a Cellular Mobile Telephone System," V. Hachenburg, B.D. Holm, and J.I. Smith, IEEE Transactions on Vehicular Technology, vol. VT 26, No. 1, Feb. 1977.
"Data Transmissions Over VHF and UHF Land Mobile Radio Channels," P.J. Cadman and R.L. Brewster, IEEE Proceedings vol. 130, Part F, No. 6, Oct. 1983.
"Data Transmission for Mobile Radio," T. Brenig, IEEE Transactions on Vehicular Technology, VT–27 No. 3, Aug. 1978.
Day, PC Computing, Jul. 1989, p. 108.
Dryden, Infoworld, Feb. 19, 1990, p. 31.
Dryden, Infoworld, Jun. 18, 1990, p. 37.
#Excerpt from "Digital Fundamental", 3rd edition, by Thomas L. Floyd, Copyright 1986, pp 562–569.
Supplementary European Search Report dated Feb. 3, 1995.
"Firm Unveils Cellular Bridge," Bartimo, InfoWorld, vol. 6, Issue 27, pp. 5, 11, and 12.
Galuszka, Data Communications, Jul., 1985, p. 68.
Godin, Electronic, Sep. 22, 1983, p. 121 et seq.
Hayes Smartmodem Owner's Manual, Hayes Microcomputer Products, Inc. 1981.
Hindin, PC Week, Jun. 28, 1988.
Hindin, PC Week, Nov. 10, 1987, p. c3.
Norwood, Computer & Communications Decisions, Apr. 9, 1985, p. 134.
Howe, Data Communications, Dec. 1982, p. 141.
Infoworld, Oct. 12, 1987, p. 8.
+Information received from Nokia on Jan. 25, 1993.
Kramer, PC Week, Nov. 13, 1989, p. 100.
Kramer, PC Week, Sep. 17, 1990, p. 129.
Kramer, PC Week, Sep. 17, 1990, p. 133.
Kramer, PC Week, Dec. 11, 1989, p. 43.
Lilly, PC Week, Jan. 7, 1986, p. 132.
Lilly, PC Week, Jan. 7, 1986, p. 135.
Lineback Electronics Report, Jun. 28, 1994, p. 48.
"Low Bit–Rate Speech Coders Applicable in Mobile Satellite Communications Systems," Neviano Dal Degan and Fulvio Russina Cselt—Centrol Studi e Laboratori Telecommunicazioni S.p.A. via G. Reiss Romoli, 274 –10148, Torino Italy.
Mier, Data Communications, Sep. 1982, p. 40.
#"Millicom Cellular Portable Telephone," Technical Disclosure, Nov. 1984, pp. 1.5, 2.6, 2.18–2.21, 6.11–6.13.
Mobile Data Report, Nov. 19, 1990, p. 3.
Mobile Data Report, Oct. 22, 1990, p. 4–5.
#Morrison & Dempsey Communications, "AB3X Cellular Interface," owner's manual, Nov. 1987.
Network World, Apr. 18, 1988, p. 15.
O'Malley, Personal Computing, Jun. 29, 1990, p. 106.
O'Malley, Mobile Office, Nov. 1990, p. 45.
"Optimal Blocklengths for ARQ Error Control Schemes," Joel M. Morris, IEEE Transactions on Communications, vol. COM–27, No. 2, Feb. 1979.
Overview of AMPS Mobile Call Processing System, Robert M. Fuller and Fred A. Epler, 1980 Annual Conference of the IEEE Vehicular Technology Society.
Ozanich, Computerworld on Communications, Jan. 18, 1984, p. 15 et seq.
Panasonic's "Easa–Phone" system described in Technical Guode KX–T 30810 for Panasonic's electronic modular switching system; and KX– T30830 for its associated telepone station.
"Portable Computer and Host Talk Over Radio–Frequency Link," Electronic, vol. 56, Aug. 25, 1983, J. Krebs.
PC Week, Jul. 16, 1985, p. 37.
"Quality of Service and Bandwidth Efficienty of Cellular Mobile Radio With Variable Bit–Rate Speech Transmission," D. J. Goodman and C.E.W. Sundberg, IEEE Transactions on Vehicular Technology, vol. VT–32, No. 3, Aug. 1983.
"R/F Linked Portable Digital Communications System Overview," Proceedings of the National Electronics Conferences (1984), Sep. 24–26, Rosemont, Ill, USA, J. Krebs, pp. 402–407.
Reiter, Network World, Oct. 26, 1987, p. 31.
Reiter and Thompson, PC Magazine, Dec. 25, 1990, p. 374.
Schneiderman, ComputerWorld, May 5, 1986, p. 17.
Rosenthal, PC Week, Mar. 18, 1986, p. s51.
Spectrum Information Technologies, Inc. et al. v. Data Race, Inc.—Affidavit of Peter Caserta.
Spectrum Information Technologies, Inc. et al. v. Data Race, Inc.—Affidavit of John Rule.
Spectrum Information Technologies, Inc. et al. v. Data Race, Inc.—Affidavit of Evan R. Smith.
Spectrum Information Technologies, Inc. et al. v. Data Race, Inc.—Amended Answer.
Spectrum Information Technologies, Inc. et al. v. Data Race, Inc.—Amended Complaint.
Spectrum Information Technologies, Inc. et al. v. Data Race, Inc.—Memo in Support Of Plaintiff's Application for Temporary Restraining Order.
Spectrum Information Technologies, Inc. et al. v. Data Race, Inc.—Response to Plaintiff's Application for Temporary Restraining Order.

Spectrum Information Technologies, Inc. et al. v. Data Race, Inc.—Transcript of Proceedings.
Spectrum Information Technologies, Inc. et al. v. Data Race, Inc.—Original Answer and Counterclaims.
Spectrum Information Technologies, Inc. et al. v. Microcom, Inc.—Complaint.
Spectrum Information Technologies, Inc. et al. v. Microcom, Inc.—Answer and Counterclaims.
Spectrum Information Technologies, Inc. et al. v. Microcom, Inc.—Answer to Counterclaims.
Spectrum Information Technologies, Inc. et al. v. Microcom, Inc.—Judgement.
Stone, P.S. "286 Laptop", Info World News, Apr. 25, 1988, p. 5.
Stone, PC Magazine, May 15, 1990, p. 220.
Stone, Infoworld, Sep. 7, 1987, p. 12.
"Technical Aspects of Data Communication," John E. McNamara, Jul. 1979, Digital Press.
Vodafone News, Feb. 13, 1985, two pages.
Bridge Between Data Communications and Cellular Telephone, Data Communications, Sec. New Products, Feb. 1985, p. 218.
ABIX: Landline Emulator For Cellular, Stuart Crump, Jr., Personal Communications Technology, Jun. 1986, p. 39.
Ameritech Nondisclosure Agreement, Jun. 1, 1985.
Millicom, Cellular Portable Telephone, Owners Manual.
Letter from A. Jason Mirabito, Gaston & Snow, Feb. 28, 1990 re: US Pat. No. 4,697,281.
High–tech Cellulars Products Demonstrated, Ameritech, vol. 3, Noe 34, Sep. 25, 1985.
Van Kirk, PC Computing, Nov. 1989, p. 136.
Welch, Infoworld, Feb. 3, 1986, p. 14.
Zimmerman, PC Week, Jun. 18, 1990, p. 49.
Document cited in U.S. Patent No. 4,654,857 issued Mar. 31, 1987, "Millicom Cellular Portable Telephone Article".
Fisher, Reed, Dual Mode MObile Unit for Next Generation Digital Narrow Channel Cellular Telephone System, CH2622–9/88/0000–0543, (c) 1988 IEEE, p. 543–547.
"Desktop Computer Goes Portable," CST News, vol. 2, No. 10, Apr. 1986, Indiana Corporation for Science and Technology, USA.
Stone, P. S., "286 Laptop", Info World Pews, May 25, 1988, p. 5.*

* cited by examiner-

PORTABLE HYBRID COMMUNICATION SYSTEM AND METHODS

Matter enclosed in heavy brackets [ ] appears in the original patent but forms no part of this reissue specification; matter printed in italics indicates the additions made by reissue.

*This application is a division of application Ser. No. 07/831,671, filed Feb. 5, 1992 (pending); which is a reissue of application Ser. No. 07/301,521, filed Jan. 19, 1989, (now U.S. Pat. No. 4,972,457).*

BACKGROUND OF THE ART

Technology offers the consumer many choices in communications hardware, allowing both data and voice transmission. These choices include portable computers with internal modems, hands-free speakerphones, landline telephones, and cellular telephones.

Modern portable computers may be equipped with an internal modem and data access arrangement that allows the internal modem to be connected through an RJ-11 connector to the Public Switched Telephone Network. Examples of this technology include portable computers manufactured by Zenith and NEC. These portable computers generally include a speaker used for call progress monitoring and this speaker is used strictly as an analog output device. The internal modems are used only for sending and receiving modulated digital information through the public switched telephone network. Methods of modulation include the Bell 212, Bell 103 CCITT V.21, CCITT V.22 and CCITT v.22 bis standards.

Hands-free speakerphones can be found in many offices and homes. Generally, three speakerphones are used as an adjunct to a classical telephone which consists of a cradle and handset; and these speakerphones are used for analog voice communications over the public switched telephone network. Digital switching techniques are sometimes used within the speakerphone circuits to prevent analog feedback from microphone pickup of the speaker output.

Cellular telephones as currently manufactured by Motorola (USA), OKI (Japan) and others consists of a radio transceiver unit (TRU) and a control unit (CU), analogous to the cradle and handset of a conventional landline telephone. The transceiver unit is connected to the control unit with numerous wires, these wires transferring the analog information as in a conventional landline telephone, and also transferring digital information not used in a conventional landline telephone. This digital information may contain key press, display, and monitoring information, as well as cellular call set-up instructions. An example of this digital and analog connection can be found in AMPS based cellular telephones, as well as other functionally similar specifications. A complete description of the AMPS system is provided in "The Bell System Technical Journal", 1979, V.1 58, No. 1, pages 1–269. Cellular phones may also provide a hands-free speakerphone, similar to speakerphones available for landline phones.

Landline and cellular telephones generally provide means of indicating to the user their current operating state. For example, when a key is pressed, an audible tone is heard, providing audio feedback, or, when an incoming call is sensed, an audible tone (RING) is heard.

There have been attempts in the prior art to combine some of the devices described above. For example, the addition of a modem to a cellular phone and means for controlling a cellular phone was disclosed by the present inventor in his U.S. Pat. No. 4,697,281. Although this patent provides for modem, transceiver unit and control unit analog and digital control, it does not provide a method for connecting numerous communication devices selectively to both land line and cellular telephone networks.

U.S. Pat. No. 4,718,080 shows a device which connects a standard landline telephone or modem to a cellular cell phone, while U.S. Pat. No. 4,578,537 shows an interface which may connect a personal computer, a speakerphone, and a modem to one or more landlines. As a final example, U.S. Pat. No. 4,685,123 teaches a method of adapting one or more telephone lines for either data or voice communications.

None of these known devices or methods succeeds in achieving the functionality ultimately possible from the combination of a modem, portable computer, cellular phone, speakerphone, headset, and landline connection. Were these devices combined within a compact, portable package, the user could use the computer, transmit data, and/or place a cellular voice call, using speakerphone or headset, from any location served by a cellular network. Further, the user could bring the unit into home or office and connect it to the public switched telephone network. With both cellular and landline connections available, the user could place two calls at once, transmitting voice or data over either line. Significantly, the portable computer could initiate all these operations under program control. If all these devices cold be combined in an integrated unit so that any pair of devices could function together, the result would be an uniquely valuable business and personal tool.

Prior to the invention disclosed herein, this combination was not conceived of in the art for a number of reasons, but primarily because the devices described were considered to be incompatible. For example, as explained in the inventor's prior U.S. Pat. No. 4,697,281, an ordinary modem loses data during cell handoffs when operated over a cellular link. As another example, ordinary telephones do not provide the correct control signals to place the calls on the cellular network, and cellular control units cannot be used as landline handsets. Thus, an integrated portable unit which combines a personal computer, cellular transmitter, modem and speaker phone with headset, cellular control unit, and land telephone concentrations could not be implemented by merely wiring known devices together.

SUMMARY OF THE INVENTION

It is a primary object of the present invention to provide a novel and improved portable hybrid communication system incorporating an integrated, portable unit which includes a personal computer, cellular transmitter, modem, and speakerphone, and which has external connections for a headset, cellular control unit, and land telephone lines, such that any of these devices may be used with any other device. The invention further includes a novel and improved method and apparatus to switch the numerous analog and digital parts of landline telephones, cellular telephones and modems so that any parts of this unit may be used together. This is all accomplished with a control system mounted on a circuit card which fits in a modem slot or similar card receiving slot in a portable computer.

Another object of the present invention is to provide a novel and improved portable hybrid communication system which provides a personal computer with the means to command a specific pairing of a cellular transmitter, modem, and speakerphone, as well as external connections to a headset, cellular control unit and landline telephone line.

This command may be sent by an automated program, or at the interactive request of the person using the personal computer.

Yet another object of the present invention is to provide a novel and improved portable hybrid communication system which can switch a modem onto either a landline or cellular telephone network.

A further object of the present invention is to provide a novel and improved portable hybrid communication system which controls the power to a cellular control unit as necessary, so that power to the control unit is available only when the control unit is to be used.

Yet another object of the present invention is to provide a novel and improved portable hybrid communication system which can sense the ON or OFF condition of the power to a transceiver unit.

A further object of the present invention is to provide a novel portable hybrid communication system which has complete control of a transceiver unit, providing the necessary signals to the transceiver unit for the transceiver unit to function properly, and sensing all of the signals generated by the transceiver unit, said control being possible without the need of a cellular control unit.

Yet another object of the present invention is to provide a novel portable hybrid communication system with complete control of a cellular control unit, provided the necessary signal to the control unit for the control unit to function properly, and sensing all of the signals generated by the control unit, allowing use of the cellular control unit.

A further object of the present invention is to provide a novel portable hybrid communication system that can sense whether or not a headset, cellular control unit, landline, or other device is connected to the invention.

A further object of the invention is to provide a novel portable hybrid communication system that selectively provides suitable control signals and data transfer protocols depending on the devices used and depending on whether cellular or land lines are being used.

A further object of the invention is to provide a novel portable hybrid communication control system that performs analog signal conditioning so that the analog signals of the speakerphone, headset, control unit, modem, tone generator, transceiver, and landline are matched in impedance and level according to definite standards.

A further object of the invention is to provide a novel portable hybrid communication system that can relay a cellular call over a land line or a land line call over a cellular network.

A further object of the invention is to provide a novel portable hybrid communication system that can simultaneously connect a modem or voice terminal device to the cellular network, while connecting another device (modem or terminal) to a landline, permitting simultaneous voice and data communications.

A further object of the invention is to provide a novel portable hybrid communication system which integrates a modem, portable computer, and cellular transmitter into a case, the case having a retractable cellular antenna.

These objects and others are achieved by providing a novel and improved portable hybrid communication system which is a laptop device including a personal computer, a cellular transceiver, a speakerphone, and a hybrid communications control unit. The device has connectors for attaching a headset, cellular control unit, land telephone line, and additional speakers and microphones.

The hybrid communications control unit is microprocessor controlled and includes a modem, a data access arrangement, and a tone generator as well as digital, analog, and power switches. The hybrid communications control unit switches the communications components and provides, under program control, the proper protocols, level, and impedance matching to connect the modem, speakerphone, headset, speaker/microphone, or cellular control unit to the landline or to the cellular network via the transceiver.

Matching and switching operations are automatic and transparent to the user. The unit can also connect two of the terminal devices or connect the cellular and landlines for call relaying. Finally, the device is capable of connecting plural calls at the same time over different networks.

The hybrid communications control unit may be controlled by its internal firmware, by toggle switches, or by commands issued from the personal computer.

Other objects and advantages of the invention will be apparent to those skilled in the art from the drawings, description, and claims herein.

DETAILED DESCRIPTION OF THE PREFERRED EMBODIMENT

Figure 1:
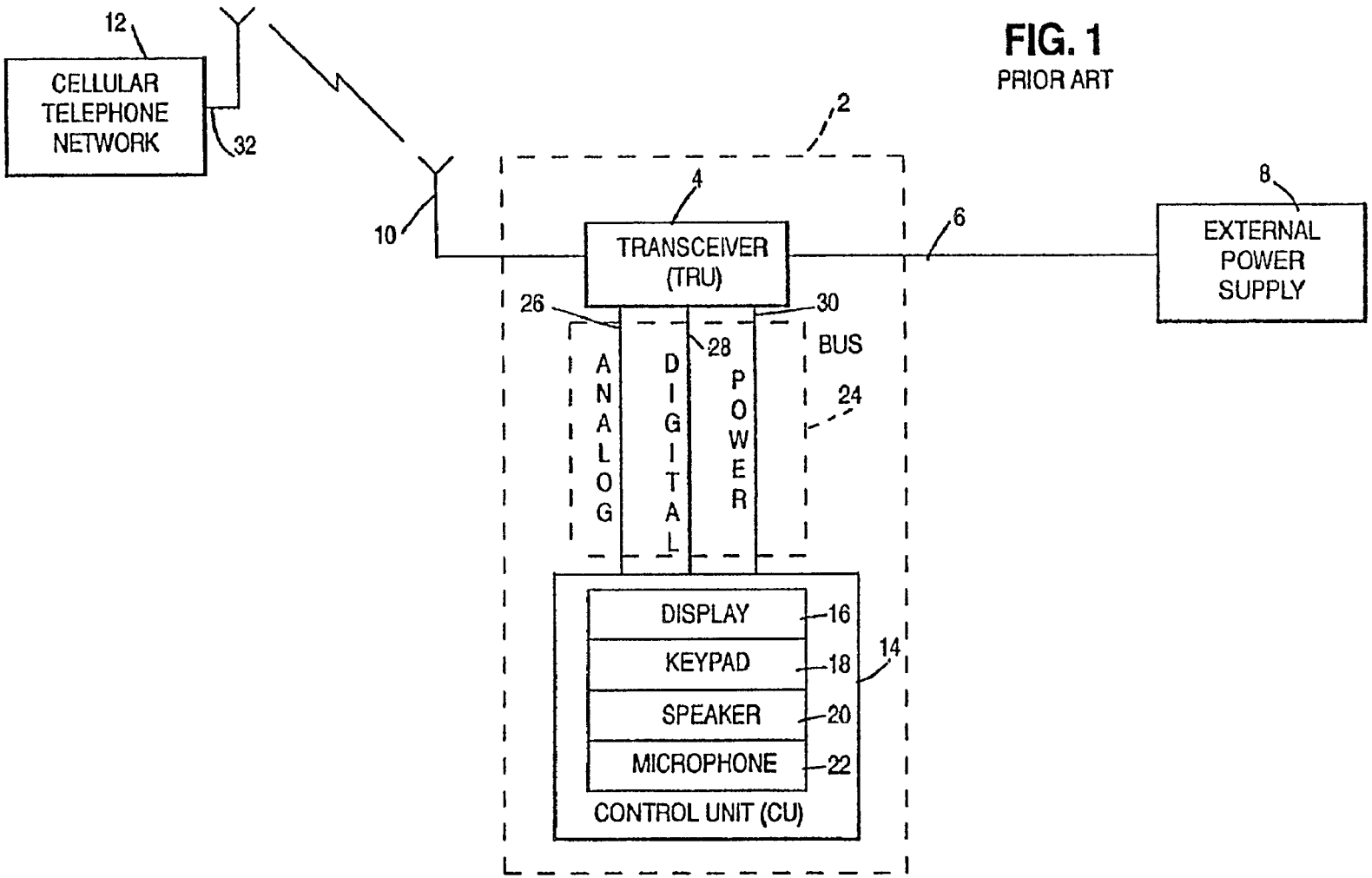
FIG. 1 PRIOR ART
FIG. 1 is a block diagram of a typical cellular telephone, with reference to appropriate external connections.
Figure 2:
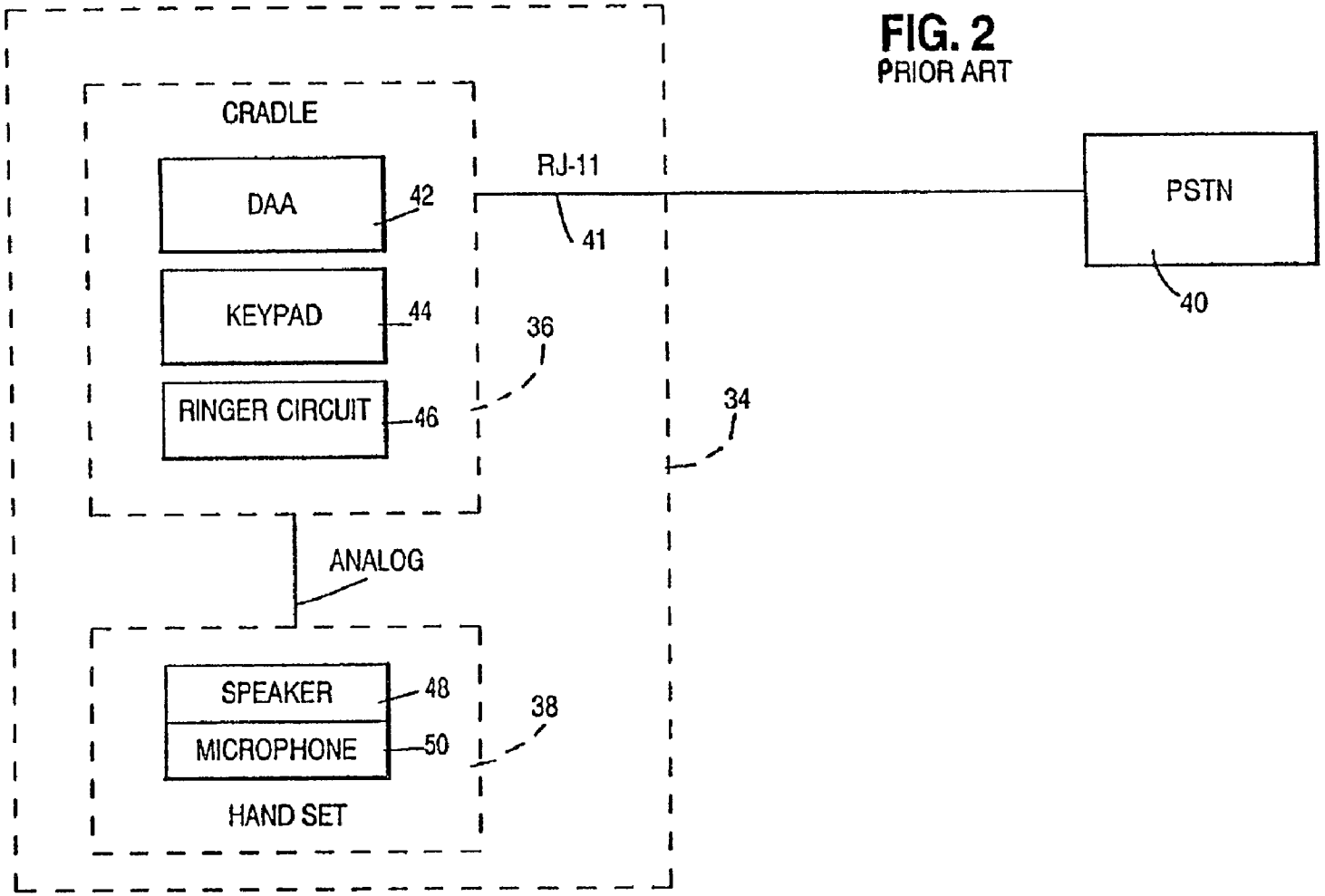
FIG. 2 PRIOR ART
FIG. 2 is a block diagram of a typical landline telephone, with reference to appropriate external connections.
Figure 3:
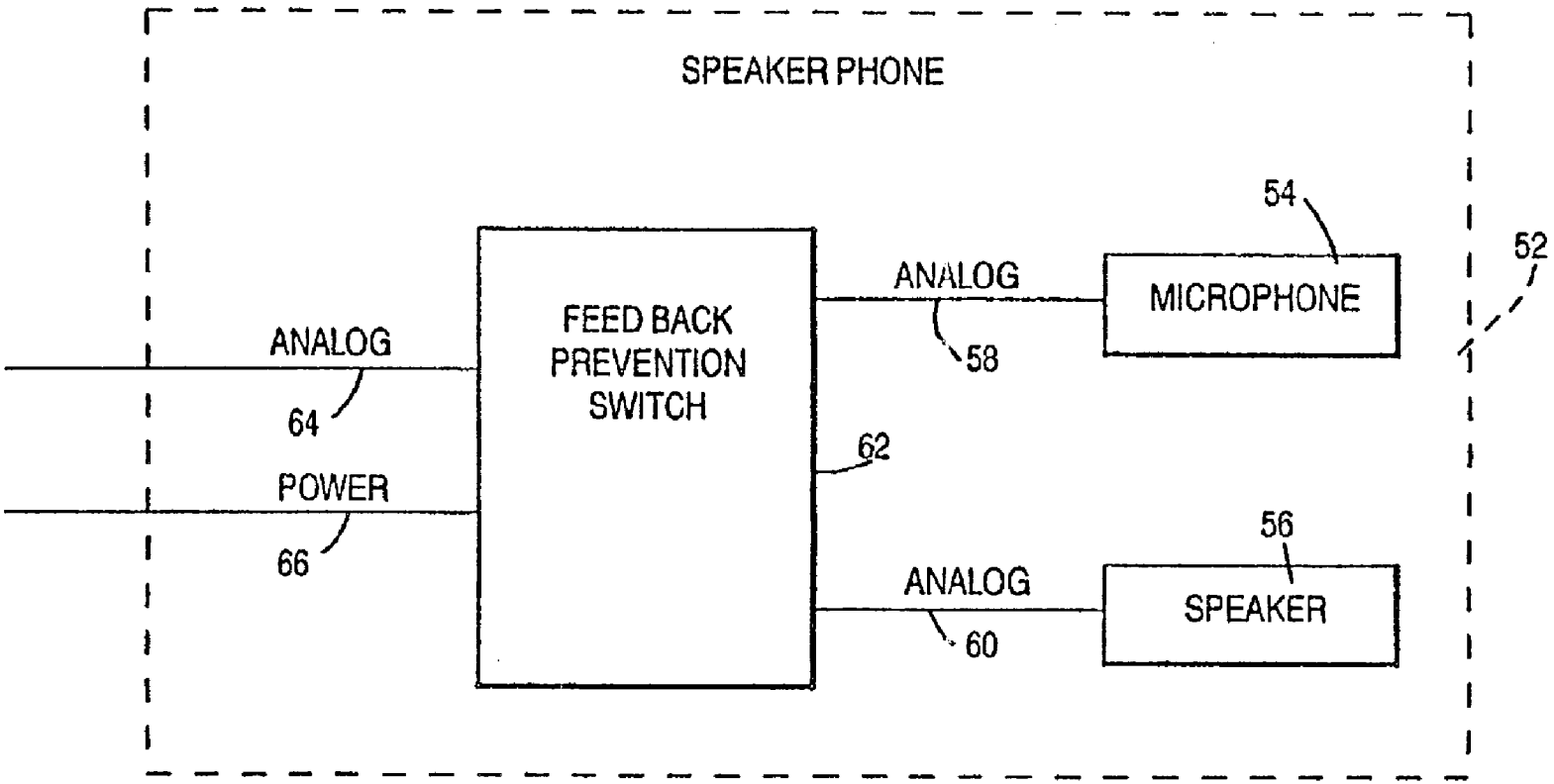
FIG. 3 PRIOR ART
FIG. 3,., is a block diagram of a typical speakerphone system; speakerphone,.

The drawings of FIGS. 1, 2 and 3 show the inputs, outputs, and components of prior art cellular telephones, landline telephone and speakerphones.

In FIG. 1, a conventional cellular telephone is shown generally at 2. The cellular telephone includes a transceiver unit 4, with an external power line 6 which obtains power from an external power supply 8. The transceiver unit 4 uses an external antenna 10 to send and receive analog voice and modulated digital instructions relative to a cellular network 12 having an antenna 32. These cellular network instructions include call set-up instructions, incoming call instructions and other cellular network control instructions. A cellular control unit 14 comprises a display 16, a keypad 18, a speaker 20, and a microphone 22. The transceiver unit 4 communicates with the cellular control unit 14 using a bus 24 consisting of numerous wires including analog wires 26, digital wires 28, and power wires 30. It is important to note that without this bus (collection of numerous wires) between the transceiver unit and the control unit, neither the transceiver unit nor the control unit will function properly. The analog voice signals present at the control unit 14 can be obtained from the analog wires 26, or can be generated by the microphone 22 to be sent through the analog wires. The digital information that occurs when a key is pressed on the key pad 18 is sent through the digital wires 28. Also digital information may be received over the digital wires 28. The power that is necessary to the proper functioning of the control unit 14 is obtained from the transceiver unit 4 through the power wires 30. The transceiver unit 4 communicates with the cellular telephone network 12 using radio waves, these waves being transmitted and received using antennas 10 and 32.

In FIG. 2 a conventional landline telephone is shown generally at 34. This telephone 34 consists of a cradle 36 and a handset 38. The telephone 34 is connected to a public switched telephone network 40 by analog wires 41 which carry analog telephone signals. The cradle 36 includes Data Access Arrangement (DAA) section 42, keypad 44, and ringer circuit 46, while the handset 38 includes speaker 48 and microphone 50. Data Access Arrangement section 42 contains the analog filters and protection devices required to connect to the public switched telephone network 40. The key pad 44 is used to provide the number to be called to the public switched telephone network 40, and ringer circuit 46 and associated signalling means are provided to inform the user when there is an incoming call.

FIG. 3 is a block diagram of a conventional speakerphone, shown generally at 52. It consists of a microphone 54 and speaker 56 connected respectively by analog transmitting lines 58 and analog receiving lines 60 to an analog feedback prevention switch 62. Analog signals are sent via analog wires 64 between the speakerphone 52 and other devices and networks (not shown). If the speakerphone 52 needs a power source, it is provided through power wires 66.

Figure 4:
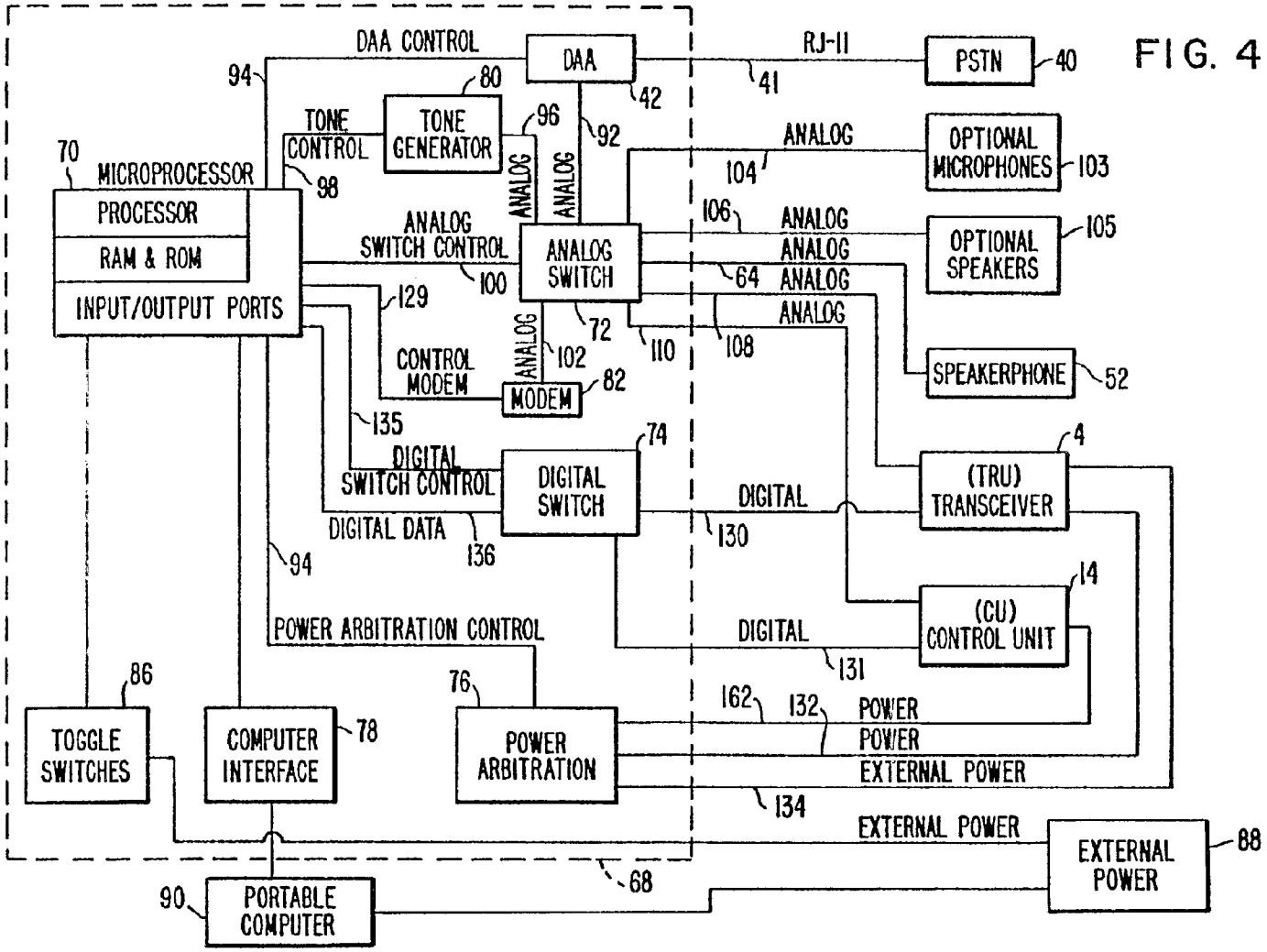
FIG. 4 is a block diagram of the invention, with typical externally connected devices shown.

The novel means for connecting and controlling these prior art devices will now be described with particular reference to FIG. 4. In this figure, units previously described are given like reference numerals. The hybrid communications control unit of the present invention is shown generally at 68. The hybrid communications control unit contains a microprocessor 70 with RAM and ROM memory and input and output ports, an analog switch 72, a digital switch 74, a power arbitration unit 76, a computer interface 78, a tone generator 80, a modem 82, a data access arrangement 42, and end user accessible toggle switches 86. All power to the unit and its parts is obtained from an external power supply 88. A portable personal computer 90 is connected to the unit 60 through the computer interface 78.

The power supply 88 is preferably the battery of the portable computer 90, or an external power supply for the portable computer, but the power supply 88 may also be any other source of power.

The microprocessor 70 may preferably be a Toshiba Z84—C15, which incorporates a Zilog Z80 processor, Z80—PI0, parallel port, Z80—SIO serial port, and Z89—CTC. As explained previously, both random access and readonly memories are connected to the microprocessor for data and software storage. The read-only memory preferably contains operating software which is the machine-code equivalent of the source code contained in the microfiche appendix attached to this specification.

The portable personal computer 90 may be any programmable computing device, such as a hand-held calculator or portable computer. One suitable model is an ITC CAT 286 which uses the MS-DOS operating system and its compatible with the IBM personal computer AT.

The hybrid communications control unit 68 connects to the public switched telephone network 40 using wires 41 and data access arrangement circuit 42, which are the essential components of the landline telephone 34 of FIG. 2. The physical connection is preferably by means of a conventional RJ-11 modular telephone connector. Analog lines 92 connect from the data access arrangement 42 to analog switch 72, where the analog signals may be switched or conditioned using methods which will be described later in more detail. This switching and conditioning allows the analog lines from the data access arrangement 42 to be selectively connected by the analog switch with the analog lines of any other connected device, such as speakerphone 52. This selective connection is controlled by the microprocessor 70, either as a result of a user request made known to the microprocessor 70 through toggle switches 86 or because of a request from the portable personal computer 90 transmitted through the computer interface 78.

The toggle switches 86 are connected to input ports of microprocessor 70. They may be of the type that can be sensed directly by the microprocessor 70, that is of a 5 volt DC logic level, or they may require debounding or other conditioning before being sensed by the microprocessor 70. Preferably, four toggle switches are provided. The first switch can be manually actuated to signal the microprocessor 70 that the cellular control unit 14 is inserted. The second toggle switch, when manually activated, signals the microprocessor that the user wishes to mute the output of a microphone 103 in use during a voice communication. The third toggle switch provides power to the cellular control unit 14, and the last toggle switch both controls power to the cellular transceiver 4 and provides a logic signal to the microprocessor 70 in the manner explained below. The power control functions of these last two toggle switches may occur directly, with the toggle switch making or breaking a connection between the power supply and the controlled unit as shown in FIG. 10, or the toggle switch may cause the microprocessor to control the provision of power to the controlled unit.

Figure 10:
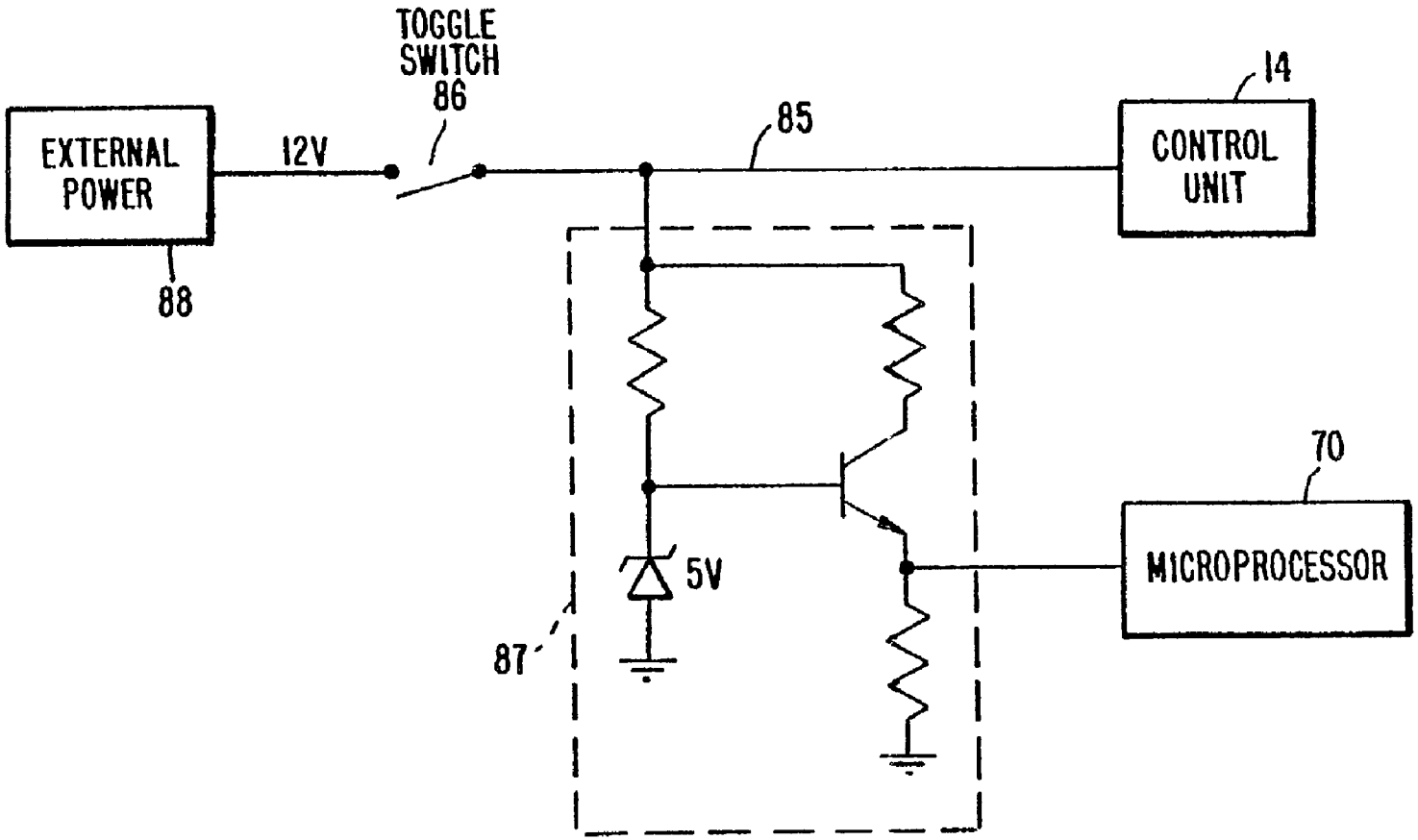
FIG. 10 is a schematic diagram showing how a toggle switch may simultaneously provide power to an external device and generate a digital logic signal.

As shown in FIG. 10, any of the toggle switches may be used to provide high current 12V DC power to an external device. In this figure, power is provided to control unit 14. External power supply 88 producing 12 VDC is connected to one of the toggle switches 86, which is connected to control unit 14 by power line 85. A conventional emitter follower voltage regulator circuit 87 is connected between power line 85 and an input port of microprocessor 70. Voltage regulator circuit 87 provides approximately 5 volts DC to microprocessor 70 when toggle switch 86 is closed, and zero volts when toggle switch 86 is open. Of course, any other voltage regulator circuit could be used in place of the circuit shown. In this way, high current 12V DC power may be switched and at the same time presented to the microprocessor as a low current, 5 volt logic level so that the microprocessor can sense the position of toggle switch 86.

Of course, a larger number of toggle switches may be provided depending on the preference of the end user. These additional switches might initiate any function performed by the present invention.

Figure 6:
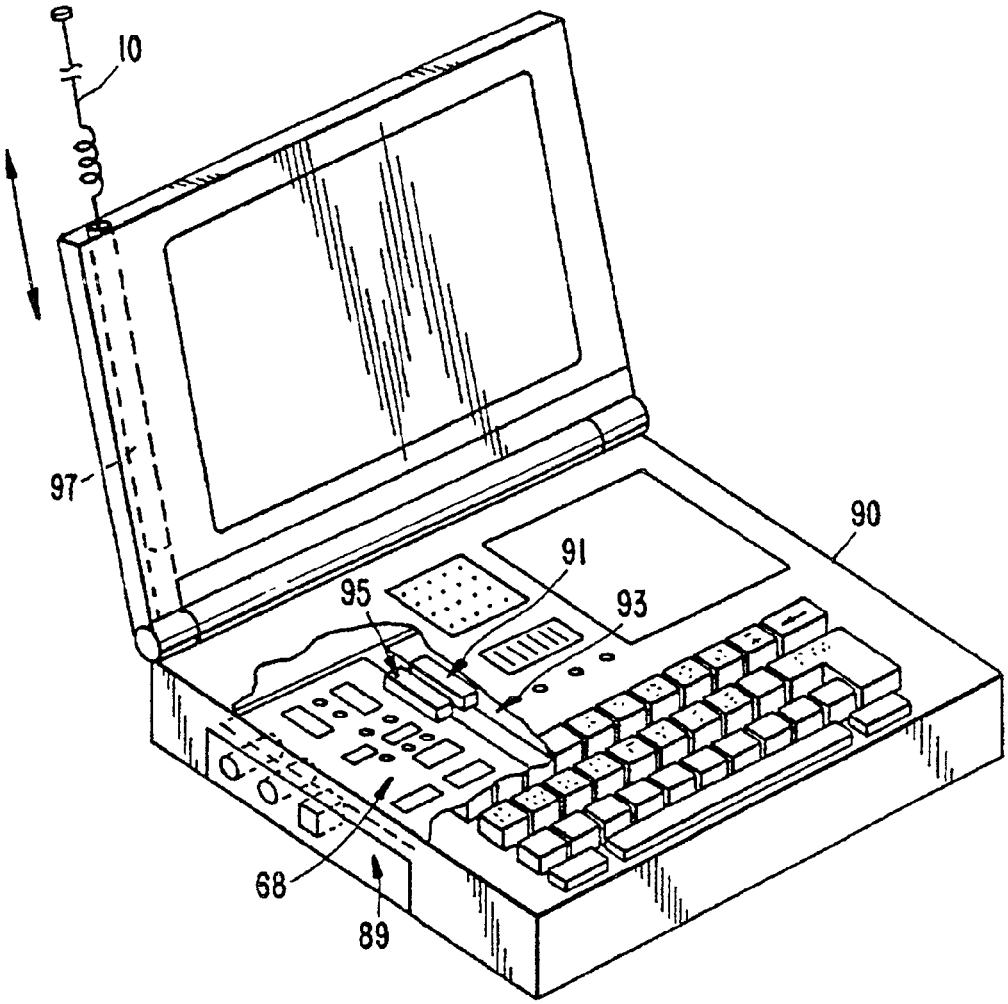
FIG. 6 is a cutaway view showing the installation of the hybrid communication control unit in the computer case.

The hybrid communication control unit 68 is preferably constructed on a circuit card about four inches wide by five inches long. In the preferred embodiment, as shown in FIG. 6, this card containing the hybrid communications control unit is of an appropriate configuration to fit in a modem slot 89 of personal computer 90. The card is provided with an appropriate conventional connector 95 which mates with a conventional modem card connector 91 mounted on the motherboard 93 of computer 90, allowing transfer of signals between the computer interface 78 of hybrid communication control unit 68 and portable computer 90.

The type of connector 95 used depends on the computer selected for construction of the present invention. The computer might be any multi-pin male, multi-pin female, or EIA connector. Alternatively, the card containing hybrid communication control unit 68 might be provided with edge contacts to mate with a printed circuit board edge connector in the computer 90. While the most common and desirable connection means have been described herein, these skilled in the art will recognize that other known connection means could be used.

In addition, the card of hybrid communications control unit 68 could be installed in computer 90 in many locations other than modem slot 89. For example, the card could be installed in a memory expansion or other expansion slot of computer 90. The card could also be located externally to the case of computer 90, either mounted on the case or designed as a separate unit to be cabled to computer 90. Similarly, the card could be located in any available space inside the computer case and connected by cable to the modem connector, an expansion connector, or another connector provided on the motherboard 93 of computer 90.

Since the hybrid communications control unit 68 may be installed in the computer 90, it should be recognized that, for so me applications, the microprocessor 70 can be eliminated and its functions can then be performed by the computer 90. For this type of operation, the computer interface 78 would be connected back into an input port of the computer 90 and the input-output ports of the computer 90 would be connected t o other components in the hybrid communications control unit 68 in the same manner as are the input-output ports of the microprocessors 70. For this type of operation, the computer 90 must have RAM and ROM memory and the capability to operate in response to a program which performs the functions of the program in Appendix A.

A cellular antenna 10 may be extended from or retracted into a compartment 97 of the portable computer case so as to protect the antenna when not in use and so as to increase the functionality and aesthetic appeal of the computer case when the system is used but cellular access is not desired. In the embodiment shown, the antenna moves in a linear fashion in and out of the compartment. Locking means (not shown) may hold the antenna in a fixed position. For example, ball-and-socket or frictional locks could be used. Alternatively, the antenna could be retracted by folding about a hinge into a recess in the portable computer case. In another embodiment, an external jack for connection of a roof-mount or other antenna could be provided.

The card bearing the hybrid communication control unit 68 is also provided with several other connectors. A first of these connectors on the card forms a connector for the speakerphone 52 and has three pins which provide transmit, receive, and signal ground lines. A second connector on the card is for the cellular transceiver and provides a pin for each line in the cellular bus 24 (shown in FIG. 1). This connector must be compatible with the cellular control unit jack of the cellular transceiver selected, and may be provided with an extension cable to facilitate the connection. A third connector on the card allows external connection of the cellular control unit 14 to the card, and is of the type that mates with the second connector previously described. A fourth connector allows external connection of additional speakers and microphones. This connector preferably takes the form of a headset jack. A final connector accepts the RJ-11 plug of the public switched telephone network as described previously. Additional connectors may be provided for additional speakers or other known telephone and computing equipment.

The computer interface 78 is preferably of the type that converses directly with a central logic bus of the portable computer 90, using the Signetics of INS 8250 universal asynchronous receiver and transmitter and conventional techniques. Of course, the device might also converse with the portable computer using RS-232 C or another known standard.

The data access arrangement 42 (DAA) may be a standalone DAA, such as Midcom part number 681—0012. A slight reduction in construction costs can be obtained by assembling a DAA out of components using techniques well-known in the art, so as to provide the protection requires to connect to the public switched telephone network. This method is preferred. Digital DAA control lines 94 connect the DAA 42 to the input/output ports of microprocessor 70, and the control lines include a ringing line. The DAA 42 may be controlled directly by the microprocessor 70 using the DAA digital control lines 94. This control prompts the data access arrangement to issue appropriate signaling direction to, and relay direction from, the public switched telephone network. Such signalling directions include Dual Tone Multi-Frequency (DTMF) dialing, on-hook and off-hook conditions, timed on/off hook sequences used for pulse dialing, and ringing sense. When ringing on the public switched telephone network line 41 is detected by the DAA 42, the DAA preferably causes an interrupt in the program sequence of microprocessor 70. Alternatively, the ringing line of the DAA control lines 94 can be latched and then polled by the microprocessor periodically.

The DTMF signals are obtained from the tone generator 80 which is shown as a separate entity but may also be located either within the data access arrangement 42 or within the modem 82. The tone generator 80 is connected to the analog switch by analog lines 96 and to the microprocessor 70 by tone control lines 98. The tone generator operates in response to control signals from the microprocessor transmitted through the tone control lines 98. The microprocessor may obtain the sequence of tones to be transmitted from control unit 14 or portable computer 90 in a manner that will be explained further. Analog signals of the tone generator may be passed to the data access arrangement 42 through the analog switch 72.

The analog switch 72 may be a 4053 manufactured by Toshiba, and a number of devices are connected to this analog switch 72. The connections internal to the hybrid communications control unit 68 will be described first. As explained previously, DAA 42 is connected to analog switch 72 by analog line 92. Tone generator 80 is connected to the analog switch 72 by analog lines 96, and modem 82 is connected to analog switch 72 by analog lines 102. Analog switch control lines 100 connect the analog switch 72 to microprocessor 70. The analog switch 72 accepts digital commands from the microprocessor 70 through analog switch control lines 100 to connect and disconnect the attached devices.

Next, the connections of the analog switch to devices external to the hybrid communications control unit 68 will be described. An optional microphone 103 may be connected to analog switch 72 by analog lines 104, while an optional speaker 105 may be connected to the analog switch by analog lines 106. The speakerphone 52 may be connected to the analog switch by analog lines 64, and the cellular transceiver 4 is connected to the analog switch by analog lines 108. The cellular control unit 14 is connected to the analog switch by analog lines 110.

Figure 5:
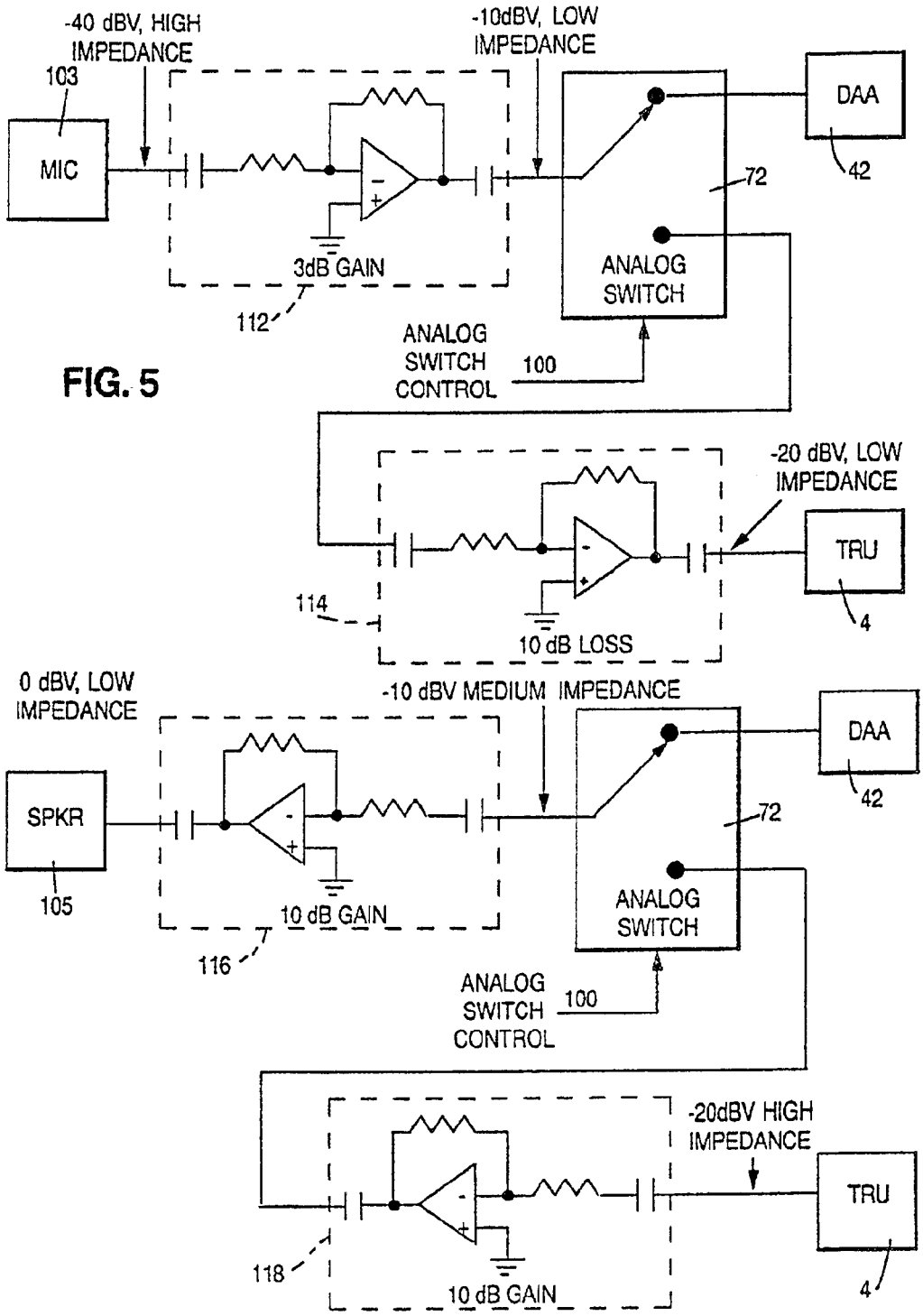
FIG. 5 is a schematic diagram showing examples of the level and impedance matching circuitry associated with the analog switch of the present invention.

As shown in FIG. 5, additional components connected at the analog switch 72 provide the level conditioning (amplification or attenuation) and impedance matching appropriate to each device. These components comprise operational amplifiers with associated resistors and capacitors. A similar circuit is used for each input and output connection of the analog switch 72, the only variation being the valves of the components, which are selected depending on the signal characteristics of the devices connected to the analog switch 72. The output and input signal are standardized according to a unique and novel scheme. This standardization is essential if the system is to be capable of operably connecting any two devices. In explaining these standards, reference will be made to terminal devices and line devices, the terminal devices being the DTMF tone generator 80, modem 82, control unit 14, speakerphone 52, microphone 103, and speaker 105. The line devices are the DAA 42 and transceiver 4.

Preferably, the output signals of all terminal devices, such as the microphone signal, are converted to a low-impedance, −10 DbV signal as part of the connection to analog switch 72. This signal is suitable for direct input to DAA 42, and is converted appropriately at the analog switch connection for input to other line devices, such as the cellular transceiver. The input signals of all connected terminal devices, such as the external speaker input, are provided at the analog switch connection with circuitry which converts a medium-impedance −10 DbV signal, as produced by DAA 42, to a signal with the characteristics required for input to the individual terminal device. The analog outputs of other line devices, such as transceiver 4, are converted at their analog switch connection to produce a signal with the same level and impedance characteristics as the signal produced by DAA 42.

Of course, other standard impedances and signal levels could be chosen within the scope of the invention. In another preferred embodiment, standards for terminal and line devices could be made the same to facilitate implementation of call relaying and connection of terminal devices to other terminal devices.

FIG. 5 shows two examples of the level and impedance matching circuits used in the preferred embodiments of the device of the present invention.

In the first example, the output of microphone 103, which may be a high-impedance (greater than 10 K Ohms), −40 DbV signal, is converted by op-amp circuit 112 to a low-impedance (less than 1K Ohms), −10 DbV signal suitable for direct switching to the DAA 42. Op-amp circuit 114 converts this same low-impedance, −10 dBV signal to a −20 dBV low-impedance signal suitable for input to cellular transceiver 4.

In the second example shown in FIG. 5, the medium impedance (1–10 K Ohms), −10 dBV output signal of DAA 42 is converted by op amp circuit 116 to a low-impedance, 0 dBV signal appropriate for input to speaker 105. The analog output of cellular transceiver 4 is converted by op-amp circuit 110 to produce a signal with the same level and impedance characteristics as the analog output signal of DAA 42.

The following chart shows typical input and output impedance and level values for devices included in the present invention. Naturally, these values will vary depending on the specific devices selected.

| ITEM | DIRECTION | LEVEL (DBV) | IMPEDANCE (KILO OHMS) |
|---|---|---|---|
| DTMF | OUTPUT | −6 | 1–10 |
| MODEM | OUTPUT | −9 | >10 |
| MODEM | INPUT | −10 TO −40 | >10 |
| DAA | OUTPUT | −10 TO −40 | 1–10 |
| DAA | INPUT | −9 MAXIMUM | <1 |
| TRU | OUTPUT | −20 | 1–10 |
| TRU | INPUT | −20 | >10 |
| CU | OUTPUT | −20 | 1–10 |
| CU | INPUT | −20 | >10 |
| SPEAKER-PHONE | OUTPUT | −40 | >1 |
| SPEAKER-PHONE | INPUT | 0 | <1 |
| MICRO-PHONE | OUTPUT | −40 | >100 |
| SPEAKER | INPUT | 0 | <0.01 |

Figure 9:
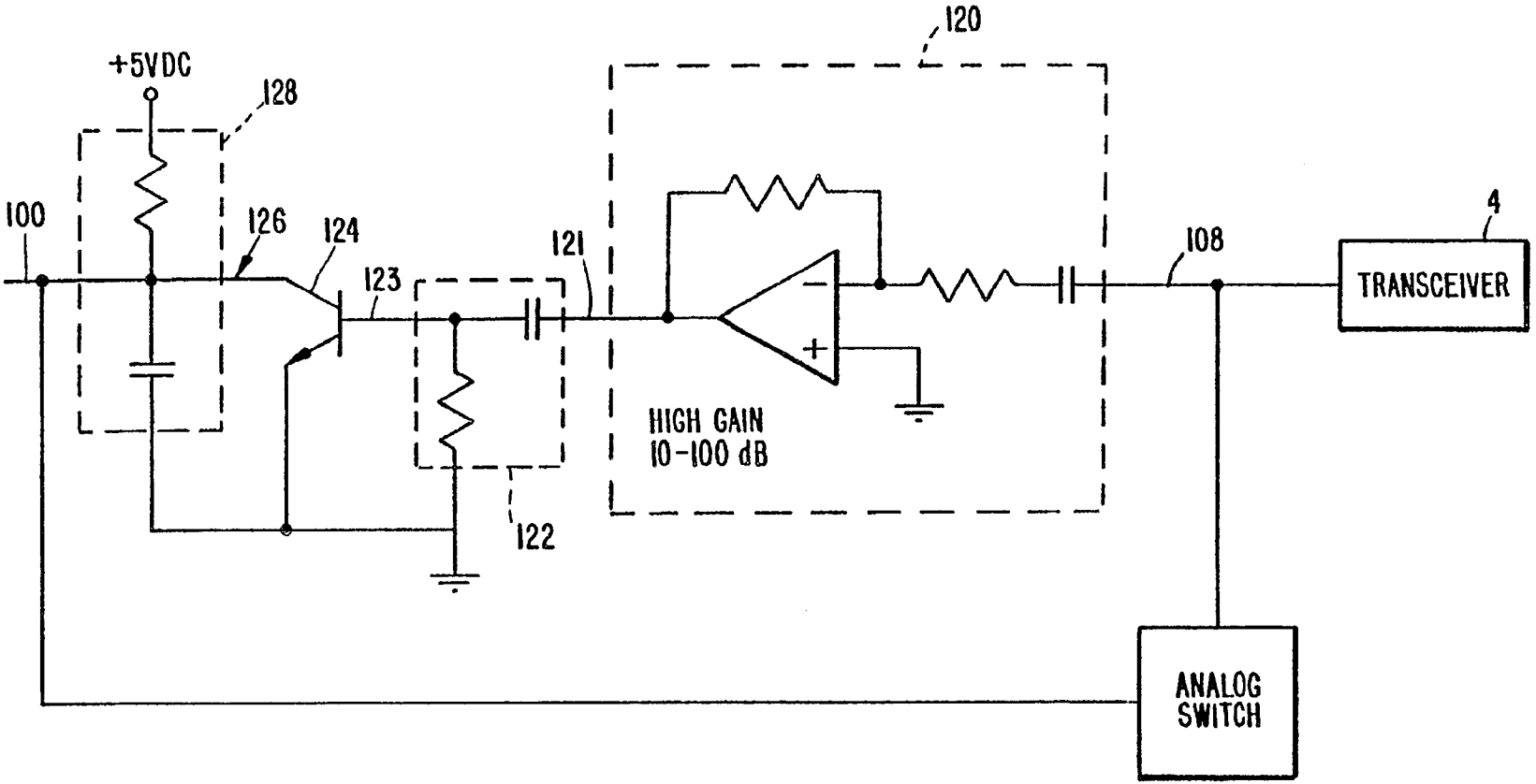
FIG. 9 is a schematic diagram of a typical method of digitally .sensing an analog signal.

Referring again to FIG. 4, when a signal appears on one of the lines 104, 106, 64, 108, or 110, circuitry parallel to with the analog switch 72 generates a service request to the microprocessor 70. FIG. 9 shows how this service request is generated in response to an analog transmission from any of the lines noted above, and for purposes of explanation, an analog signal from cellular transceiver 4 will be used in FIG. 9. Referring now to FIG. 9, the transceiver 4 is connected to analog line 108, which is connected to an input of an amplifier 120 which has an output 121. The output 121 of amplifier 120 is connected to a capacitor and resistor circuit 122 having an output 123. This output 123 is connected to the base of a transistor 124 having an emitter tied to ground and a collector 126 which provides an output. Collector 126 is connected to an RC network 128 having a resistor connected between collector 126 And +5 VDC, and a capacitor connected between collector 126 and ground. The RC network 128 is connected to a sensing line of the analog switch control lines 100. The service request is created by taking the low level analog signal provided at analog line 108 and amplifying it to a very high level voltage with the amplifier 120. This high level signal will alternately charge and discharge the capacitor and resistor circuit 122 in accordance with the period of the analog signal on analog line 108. This charging and discharging of the circuit 122 will turn the transistor 124 off and on, and this transistor switching can be used to provide a digital level signal directly to the microprocessor. Preferably, however, the signal is further conditioned by the RC network 128 to provide a signal which is easily sensed by the microprocessor. The microprocessor can record in RAM memory the condition of signals received in this manner, or the processor can poll the outputs 100 when it is necessary to know which devices are connected. The circuit of FIG. 9 thus allows the microprocessor to keep track of the devices that are connected to the portable hybrid communications system in an unique and novel manner.

The analog switch 72 acts as a cross-point switch, so that it is possible for more than one pair of analog signals to be connected at once without interferences. For example, the cellular transceiver 4 could be connected to the speakerphone 52 while the data access arrangement 42 is connected to the modem 82, allowing simultaneous voice and data communications. This operation is made possible in part by the unique circuit disclosed and the standardization of analog levels of the present invention.

The modem 82 is directed by the microprocessor 70 using a modem control line 129. These directives include turing on and off the various stages of the modem's modulation and demodulation circuits. The analog signals produced by modem 82 are connected to the analog switch 72 so that the analog signals are available for switching, in a manner similar to the analog connection of the data access arrangement 42 to the analog switch 72. The microprocessor preferably receives and retransmits data to and from modem 82 and computer interface 78. Alternatively, a direct data connection or connection switchable manually or under the control of microprocessor 70 may be provided.

The operation of the power arbitration unit 76 will now be described. Input/output ports of microprocessor 70 are connected by power arbitration control lines 94 to the power arbitration unit 76. The power arbitration unit 76 contains circuitry which responds to the digital signals of microprocessor 70 to connect and disconnect external power from external power supply 88 to control unit 14 and transceiver 4. This power arbitration uses conventional microprocessor controlled switching units and techniques and the microprocessor signals are issued at the request of the user or by the microprocessor's own internal program. Power wires 162 are provided between the control unit 14 and power arbitration unit 76. These wires provide the control unit 14 with power for operation, and are controlled by the microprocessor 70 using the power arbitration unit 76, thus giving the microprocessor 70 control of signal and power availability to the control unit 14. Power line 132 and external power line 134 connect power arbitration unit 76 and transceiver 4 so that the power arbitration unit 76 can control power to transceiver 4 in response to signals from microprocessor 70. The microprocessor 70 may store the status of power to the control unit and transceiver in random access memory for use as described later.

Digital switch 74 is connected to microprocessor 70 by digital switch control line 135 and digital data line 136. The digital switch is also connected to the cellular transceiver 4 by digital lines 130 and to the control unit 14 by digital lines 131. The digital signals provided by the transceiver unit 4 and control unit 14 are presented to the digital switch 74 of the hybrid control unit where they may be conditioned as necessary before being presented to the microprocessor 70.

Figure 8:
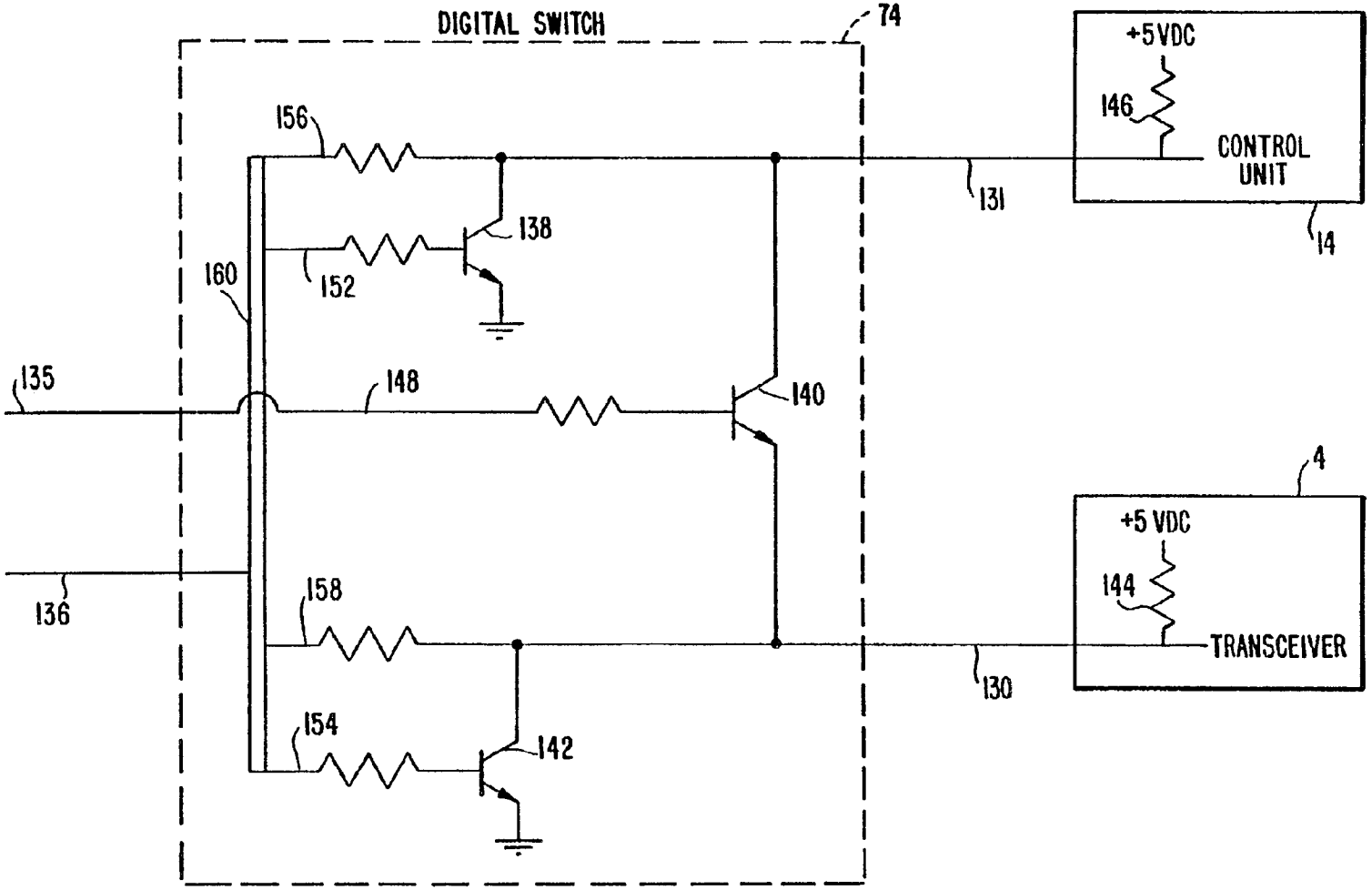
FIG. 8 is a schematic diagram of a port of the digital switch.

FIG. 8 is a schematic diagram of a portion of digital switch 74. Only the circuit for one pair of digital data lines 131 and 130 is shown. There are actually a plurality of digital data lines 131 and 130, so that a plurality of the circuits illustrated in FIG. 8 are used in the system, one for each digital data line pair 130 and 131. Depending on the control unit and transceiver selected, some of the digital lines 130 and 131 may need only some of the digital switch functions. For example, a line may only require sensing by the processor. Those skilled in the art will appreciate that the entire circuit shown need not be provided for such lines. The circuit shown consists of a control unit pull down transistor 138, a control unit-to-transceiver pass thru transistor 140, a transceiver pull down transistor 142, each transistor having a base, emitter, and collector, and associated resistors. Transistors 138, 140 and 142 may preferably be Motorola 2N2222A types.

Specifically, the digital switch control line 135 is connected to a control unit-to-transceiver pass thru control line 148 which is connected through a resistor to the base of the control-unit to-transceiver pass thru transistor 140. The collector of transistor 140 is connected to digital data line 131, while the emitter of transistor 140 is connected to digital data line 130.

Digital data line 131 is connected through a resistor to a control unit sense line 156, which is connected through an internal input/output bus 160 to one of the digital data lines 136. Likewise, digital data line 130 is connected through a resistor to a transceiver sense line 158, which is also connected through the bus 160 to a different digital data line 136.

Two additional digital data lines 136 are connected through bus 160 to a control unit assert line 152 and a transceiver assert line 154 respectively. Control unit assert line 152 is connected through a resistor to the base of the control unit pulldown transistor 138. The collector of this transistor 138 is connected directly to digital data line 131, while its emitter is connected directly to ground. Likewise, transceiver assert line 154 is connected through a resistor to this base of the transceiver pulldown transistor 142. The collector of the transistor 142 is connected directly to digital data line 130, while its emitter is connected directly to ground.

The digital lines 131 of the control unit 14 and digital lines 130 of the transceiver 4 are, in the preferred embodiment, open-collector type lines. Inside the transceiver 4 and control unit 14 are pull-up resistors 144 and 146 that provide the voltage used to sense the logic level when the digital lines 131 and 130 are in their open collector state. These pull-ups may be placed within the digital switch 74 when not provided by the control unit 14 and transceiver 4. When the microprocessor asserts digital switch control 135, the control unit-to-transceiver pass thru control line 148 is asserted, turning on the control unit-to-transceiver pass thru transistor 140 thus connecting the control unit digital line 131 to the transceiver digital line 130 and allowing data to flow between the control unit 14 and transceiver 4. When the control unit-to-transceiver pass thru transistor 140 is turned off, the control unit 14 and transceiver 4 cannot exchange digital information.

The control unit and transceiver may be used independent of each other if proper digital information is provided to them. The microprocessor can provide the proper digital information by using its digital data lines 166. A plurality of digital lines 136 are used to enable assertion and sensing of each pair of digital data lines 130 and 131. These asserting and sensing lines are bussed internally to the digital switch 74 on the internal Input/Output Bus 160. When asserted, the appropriate digital data line 136 asserts the control unit assert line 152 or transceiver assert line 154 to turn on respectively control unit pull down transistor 138 or transceiver pull down transistor 142. This will change the state respectively of the control unit digital line 131 or transceiver digital line 130 from their open collector pulled up (high) condition to an asserted pulled down (ground) condition, thus allowing transmission of digital signals between the microprocessor 70 and the control unit 14 or transceiver 4 respectively. Any digital signals present on the digital lines 131 or 130 are sensed by the microprocessor through the control unit sense line 156 or the transceiver sense line 158, which are connected through bus 160 to appropriate digital data lines 136. Preferably, individual digital switch control lines 135 and digital data lines 136 are provided from the input/output ports of the microprocessor. If sufficient ports are not available, additional multiplexing circuits may be interposed between microprocessor 70 and digital switch 74 in a manner well known in the art.

Of course, methods of digital signaling other than the open collector method could have been chosen for the signaling used between the control unit 4 and transceiver 4, such as open-emitter, with pulldown resistors and pullup transistors, or methods where no open circuit conditions exist.

Referring again to FIG. 4, all required digital signals necessary to the proper functioning of the transceiver unit 4 are provided by directives issued from the microprocessor 70 through digital data lines 136, through the digital switch 74, through the digital wires 130 to the transceiver unit 4. An example of a necessary digital signal of this type is an ON/OFF signal, this signal being conventionally given to the transceiver unit 4 by user keystrokes on the key pad of the cellular control unit. These necessary signals may be directed by the microprocessor 70 as a result of its own internal program, or at the request of the user. User requests may be obtained through the portable computer 90 and computer interface 78 or by the user setting one of the toggle switches 86.

The relationship and connection of conventional devices to the hybrid communications control unit will now be described. The speakerphone 52 is preferably built into a case holding the portable computer 90. The hybrid communications control unit obtains access to the analog signals of the speakerphone 52 using the analog wires 64 included in the speakerphone 80, which terminate in a three-pin connector which mates with the speakerphone connector on the hybrid communications control unit board. The microprocessor 70 controls switching and conditioning of the analog signals using the analog switch 72, in a manner similar to the switching of the data access arrangement signals by analog switch 72.

The invention may incorporate other optionally speaker 105 and microphones 103, which their analog signals connected to the analog switch 72 using analog wires 106 and 104, respectively, in a manner similar to that used with the analog signals of the data access arrangement 42 or speakerphone 52. An external speaker and microphone in the form of a telephone headset is preferably used in the present invention.

The cellular transceiver unit 4 is preferably built into the personal computer case in a space which might otherwise be occupied by a disk drive. The transceiver is connected to the invention by wires similar to those in the transceiver unit bus 24 (shown in FIG. 1), specifically analog wires 108, digital wires 130, power wires 132 and external power wires 134. All analog signals present at the transceiver unit 4 are switched and conditioned by the analog switch 72.

Thus, the total operating condition of the transceiver unit 4 is known and may be controlled by the microprocessor 70. Control signals may be initiated through the microprocessor's internal program or by user interaction with the microprocessor, either through the toggle switches 86 or through the portable computer 90. The microprocessor 70 can switch the analog signals of the transceiver unit 4 onto any of the remaining analog paths by controlling the operating state of the analog switch 72. The microprocessor 70 can selectively apply or remove external power to the transceiver unit 4 using the power arbitration unit 76.

The cellular control unit 14 preferably connects to a jack on the portable computer case, this jack being connected to the hybrid communication control unit board through a cable and connector which mates with the appropriate connector on the board (previously described). The analog wires 110 are connected to the analog switch 72, thus providing the microprocessor with the ability to switch the analog signals of the control unit as required. The digital wires 131 are connected to the digital switch 74, thus providing the microprocessor 70 with status sense and digital control of the control unit 14 as described previously, and the power wires 162 are connected to the power arbitration unit 76, providing the microprocessor with the ability to control the power to the control unit 14 as explained previously. Thus, the microprocessor 70 has complete control of the functioning of the control unit 14 as it has with the transceiver unit 4.

OPERATION

In the first mode of operation, voice calls can be placed and received on the public switched telephone network. At the request of the user communicated by toggle switch 86 or as a result of a user- or software-generated signal from the portable computer 90 sensed through computer interface 78, the microprocessor 70 instructs the data access arrangement 42 through the digital control lines 94 to take the public line off-hook.

If tone dialing is to be used, the microprocessor directs the analog switch 72 to connect data access arrangement 42 and tone generator 80, whereupon the microprocessor transmits tone commands for the number to be dialed to tone generator 80 through tone control line s 98. If pulse dialing is desired, the microprocessor transmits the proper series of on- and off-hook signals to the data access arrangement 42 using DAA control lines 94.

After dialing, the microprocessor commands the analog switch 72 to connect the analog wires 92 of the data access arrangement 42 to the analog wires 64 of the speakerphone 52 thus providing the user with speakerphone access to the public switched telephone network 40.

On completion of the call, the user can instruct the microprocessor to disconnect the public telephone line using the switch or computer means previously described. The microprocessor will then instruct the data access arrangement to place the landline on-hook, and instruct the analog switch to disconnect the voice device and data access arrangement.

When the public switched telephone network signals to the data access arrangement 42 that an incoming call is present, that condition (ringing) is sensed by the microprocessor through the ringing line of data access arrangement control lines 94, either through an interrupt or by polling the circuit. The microprocessor makes the user or portable computer aware of this condition by sending a message through the computer interface 78 or by placing an audible tone generated by the data access arrangement 42 or elsewhere (such as the tone generator 80) on any speaker analog path (such as on optional speaker 105 by means of wires 106). The user may then elect to answer or ignore the call. This decision is sent to the microprocessor 70 by the user using the portable computer 90. Alternatively, a toggle switch could be provided for this purpose. In addition, the microprocessor 70 may be instructed any time prior to the ringing condition to always answer the call (auto-answer mode).

For incoming calls, the microprocessor 70 selects the device to be connected in a novel manner, based on the devices connected and programmed priorities. The microprocessor knows the present power-on condition of the transistor unit 4 and control unit 14 by monitoring the power arbitration unit 76. The present of optional speakers 105 can be sensed at the optional speaker connection, using the toggle switch method similar to that previously described for the high current external power switch for the transistor unit.

The presence of public switched telephone network 40 can be sensed using the data access arrangement 86 and analog switch 72 as described previously with reference to FIG. 9. The microprocessor can then choose, based on the availability of speakers and microphones and based on its preprogrammed priorities, the most appropriate analog path to use for all analog signals. Preferably, the microprocessor will first check for the presence of a headset, connecting the incoming call thereto if the headset is present. If there is no headset present, the microprocessor will direct that the incoming call be connected to the speakerphone. Those skilled in the art will appropriate that these priorities could be modified and that other devices could be included in the priority. While the priority is preferably built into the firmware, priorities could also be modifiable by the end user, either by sending a command from the personal computer or by adjusting toggle or dual-inline-pin switches.

The device of the present invention may also place and answer calls over the public switched telephone network 40 using analog devices that are not part of the speakerphone 52, such as speaker 105 and microphone 103 which are preferably embodiment in a unitary headset which plugs into the hybrid communications control unit board.

In a second mode of operation, the modem 82 can be used to send and receive data over the public switched telephone network 40 using the data access arrangement 42 in a manner similar to that previously described using the speakerphone 52, except that the analog switch 72 connects the modem 82 to the data access arrangement 42 rather than connecting the speakerphone. After the call is set up, the microprocessor 70 directs modem 82 to transmit data using standard protocols and error checking that are well-known in the art. Data is transmitted to and received from the microprocessor 70 by the portable computer 90 through computer interface 78. The microprocessor 70 retransmits the transmitted data to the modem 82, where the digital data is converted to a modulated analog signal and transmitted over the public switched telephone network. The microprocessor receives incoming data from the modem and retransmits this received data to the portable computer 90.

In a third mode of operation, the system can place and receive calls over the cellular telephone network. Cellular calls may be placed using the speakerphone 52 or the handset comprising speaker 105 and microphone 103, but in a manner different from that previously described for placing and receiving the speakerphone calls over the public switched telephone network. Microprocessor 20 first sends the proper digital signals to transceiver 4 through digital data lines 136, digital switch 74, and digital data lines 130, instructing the transceiver to initiate a call to the desired number. The microprocessor then instructs analog switch 72 to connect the analog wires 108 of the transceiver unit 4 and the analog wires 64 of the speakerphone 52. When the user indicates to the microprocessor that the call is complete, disconnect instructions are transmitted to the transceiver and analog switch.

When there is an incoming call on the cellular network, the system processes the incoming call in a novel and unique manner. The processing required depends on the type of transceiver used. For example, Motorola broad transceivers generate a digital signal to alert the user to ringing, while OKI brand transceivers generate an alternating series of analog tones. The OKI transceiver also uses analog tones to indicate busy, ringing, and out-of-service area signals. These signals differ from the incoming call signal.

If the transceiver used produces digital signals, an incoming call will be signalled on digital line 130, causing the digital switch 74 to request service from the microprocessor 70. The microprocessor will read the data from the transceiver, if the data indicates an incoming call, the microprocessor will inform the user and may connect the call to the speakerphone, headset, or other device.

If the transceiver produces an analog signal to announce an incoming call, this signal will appear on analog data line 108. Analog switch 72 will generate a service request to microprocessor 70 using the circuitry described earlier and shown in FIG. 9. The microprocessor will evaluate the cadence or period of the signal to determine whether it is actually an incoming call signal, rather than one of the other signals described previously. On confirmation of an incoming call condition, the microprocessor will inform the user and take action as described previously.

In a fourth mode of operation, the invention allows the modem 82 to be used during a cellular telephone network call placed using the transceiver unit 4. The microprocessor first signals the transceiver 4 to initiate the call as described in the procedure for placing a cellular voice call. Next, the processor directs analog switch 72 to connect transceiver 4 to modem 82 using analog lines 108 and analog lines 102, respectively. The microprocessor 70 then accepts data from the portable computer 90 through interface 78 for retransmission. The microprocessor then selects a special protocol for use on the cellular network, this automatic protocol selection being novel and unique. Rather than using standard data transfer methods as with the landline, the microprocessor will preferably retransmit the data through the modem in variable-sized packets with special protocols and error checking appropriate to a cellular environment. These methods are described in detail in the inventor's U.S. Pat. No. 4,697,281, which disclosure is incorporated herein by reference. Data received from the cellular link will be demodulated by the modem 82 and checked by the processor, which will remove the overhead bits needed for error checking and then retransmit the data to the portable computer 90. As in the other ordinary modes described, the setup process is reversed when the call is complete.

In a fifth mode of operation, the microprocessor 70 can cause the control unit 14 to assume its "original" function of placing and receiving calls over the cellular telephone network. The microprocessor 70 sends controlling information to the power arbitration unit, analog switch 72, and digital switch 74 directing these devices to connect all control unit wires and paths to their corresponding transceiver unit ires and paths. Transceiver functions can then be controlled directly by the control unit.

In a sixth mode of operation, the cellular control unit 14 can be used to place calls on the public telephone network. This mode of operation provides novel and unique functionality since cellular control units cannot normally be used with public telephone network lines. In this operation mode, the speaker and microphone of the cellular control unit are used in conjunction with the data access arrangement 42 to place and receive calls over the public switched telephone network 40 in a manner similar to that shown for placing and receiving calls over the public switched telephone network using the speakerphone 52.

The keypad 18 (shown in FIG. 1) of control unit 14 can be used to direct the microprocessor 70, rather than using the toggle switches 86 or portable computer 90. As described previously, the digital switch 74 makes data available to the microprocessor when a connected device transmits. This signal can be used as an interrupt or can be latched and polled by the processor. Through digital data line 131, digital switch 74, and digital data line 136, the microprocessor can then accept data representative of the keys pressed on the control unit. Thus, dialing instructions may be obtained from the key pad 18 of the control unit 14. Note that the control unit 14 does not provide any internally generated audible feedback when a key is pressed on the key pad 18. This audible feedback is normally provided by the transceiver unit 4 when the control unit 14 is used with the transceiver unit 4 as in FIG. 1. Therefore, audible feedback must be provided by other means. When a key is pressed on the key pad 18 of the control unit 14, the microprocessor may instruct the tone generator 80 to produce a specific frequency and cadence analog signal that is transmitted through the analog switch to any available speaker, such as the optional speaker 105.

Further, as the control unit 14 contains a display, audible signals and digital messages previously described that originate from microprocessor 70 may be augmented by a visual message on that display, shown at 16 in FIG. 1. The microprocessor 70 produces the visual message by sending the appropriate digital commands through the digital switch 74 means to the control unit 14 and thus to its display 16.

Also, as the control unit may not always have its microphone 22 and speaker 20 enabled, the microprocessor 70 ma issue appropriate directives to the control unit 14 through digital data line 136 to enable the control unit's microphone and speaker. Disabling of the speaker and microphone can be directed in a like manner.

As the key pad of the control unit 14 contains an On/OFF switch, said switch may be used as a toggle switch 86 in a manner similar to that of the previously described high current power switch for the transceiver unit 4.

Additional functions possible with mirror modifications to the preferred embodiment include connections that are not commonly desired such as speakerphone to control unit.

The present device can also relay calls in a novel and unique manner by connecting the data access arrangement to the transceiver unit. While the software in the attached microfiche appendix does not implement this feature, the flow diagram of FIG. 7 shows the required steps for relaying a cellular call to a landline.

Figure 7:
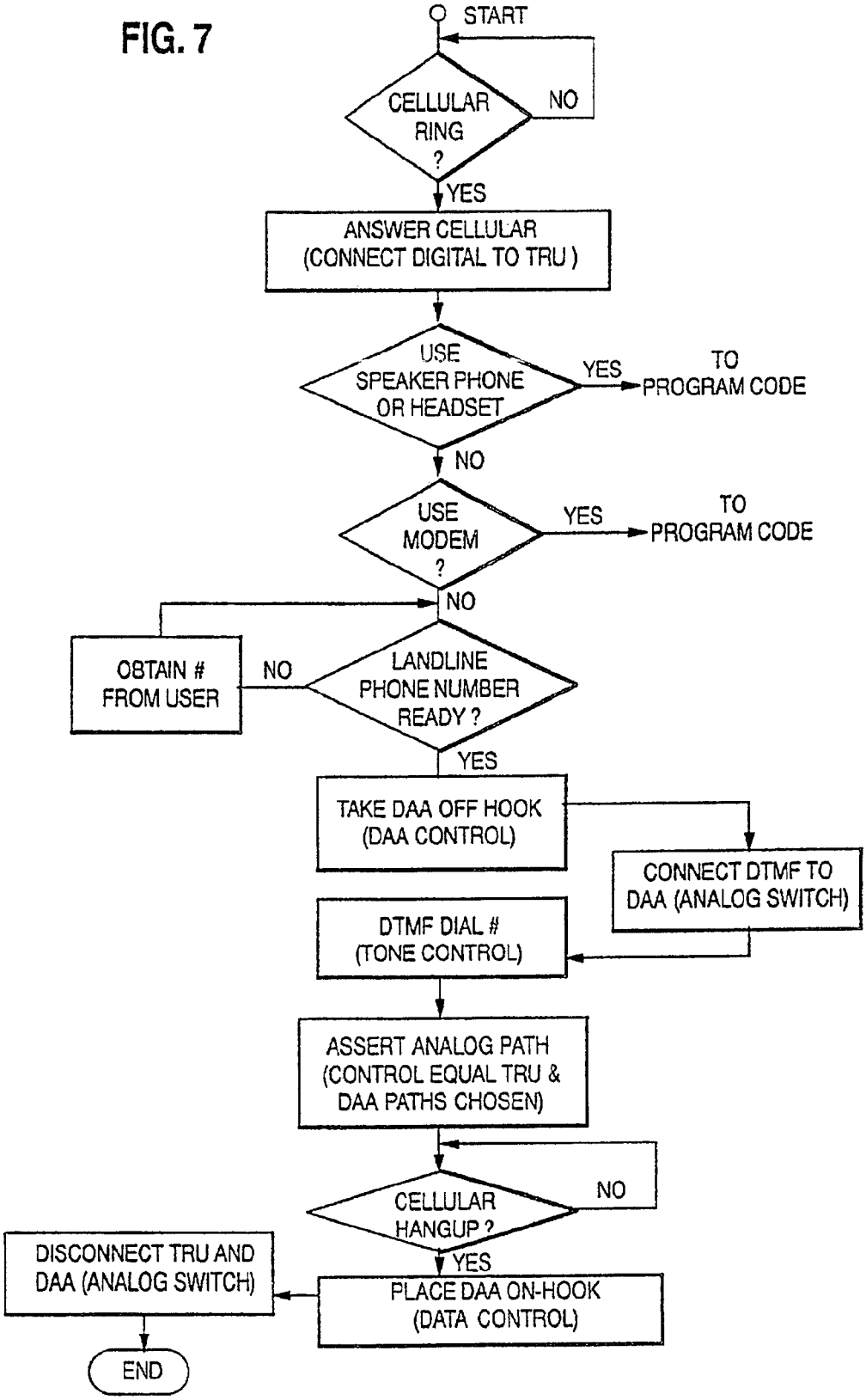
FIG. 7 is a flow diagram showing the procedure for relaying an incoming cellular call to a landline.

Referring now to FIG. 7, a cellular ringing condition initiates the process. The microprocessor sends signal to the transceiver, directing the transceiver to answer the cellular call. The microprocessor then determines whether the user would like the call connected to the speakerphone or headset, or to the modem. The user can give instructions at the time of call receipt, or the instructions may have been given at an earlier time. If no connection to a terminal device is desired, the microprocessor waits for a landline phone number. This number can be entered from the personal computer 90, from the control unit 14, or may have been entered at an earlier time. When the number is ready, the microprocessor follows the steps required to place a landline call, including taking the line off hook, connecting tone generator 80 to DAA 42, an d generating DT MF t ones. The microprocessor then instructs the analog switch to connect the transceiver 4 and DAA 42. The microprocessor then waits until the cellular call is terminated, either by the caller or by the user. The microprocessor then signals the DAA to place the landline on-hook and signals the analog switch to disconnect the TRU and DAA.

This same general procedure can be used to relay calls from the landline to cellular.

In addition, those skilled in the art will appreciate that more than one of the functions described hereto can be performed simultaneously so long as the analog switch chosen is capable of connecting more than a single pair of devices. Thus, in a novel and unique manner, the system can either provide voice and data channels at the same time, or provide two voice channels at the same time, one channel being over the public telephone network and one channel being over the cellular network.

INDUSTRIAL APPLICABILITY

The present invention relates to communications in the portable environment generally, and more specifically to the cellular and landline telephone networks, and their access using both voice and data methods a well as portable computer control of that access.

I claim:

[1. A portable hybrid communications system comprising:

(a) entry means for entering a data signal;

(b) public telephone network connection means for accessing a public telephone network in response to public telephone accessing control signals;

(c) modem means for modulating and demodulating data signals;

(d) cellular transceiving means for accessing a cellular network in response to cellular network accessing control signals;

(e) analog switch means connected to the public telephone network connection means, to the cellular transceiving means, and to the modem means;

(f) digital data connecting means for selectively creating a digital data transmission connection with the cellular transceiving means;

(g) central processing means connected with said entry means, said public telephone network connection means, said modem means, said analog switch means, and said digital data connection means for generating public telephone accessing control signals and cellular network accessing control signals and for selectively operably connecting the modem means to either the public telephone network or the cellular network so that the central processing means may transmit or receive information over the public or cellular network.]

[2. The system of claim 1 wherein the entry means is a personal computer interfaced to the central processing means.]

[3. The system of claim 1 having means to selectively control power application to the cellular transceiving means.]

[4. The system of claim 1 wherein signal sensing means responsive to incoming cellular or public telephone network calls signals the user that an incoming call condition exists.]

[5. The system of claim 1 wherein the central processing means may selectively operably connect an active cellular network line to an active public telephone network line for call relaying.]

[6. The system of claim 1 wherein a cellular antenna associated with the cellular radiotelephone transceiving means is retractable into a case housing the system.]

[7. The system of claim 1 wherein the central processing means resides on a circuit board which fits in a card slot of the personal computing means.]

[8. The system of claim 7 wherein the card slot is a modem card slot.]

[9. The system of claim 1 further including voice signalling means for generating and receiving voice signals connected to the central processing means, wherein the central processing means selectively operably connects said voice signalling means to either the public telephone network connection means or the cellular transceiving means.]

[10. The system of claim 9 wherein the central processing means may selectively operably connect the modem means to either the cellular transceiving means or the public telephone network connection means, while the central processing means may operably connect the voice signal generating and receiving means to the other of the cellular transceiving means or public telephone network connection means, permitting simultaneous voice and data communications.]

[11. The system of claim 9 wherein the central processing means selectively produces a first processing method when data signals are transmitted or received using the public telephone network and a second processing method when data signals are transmitted or received using the cellular transceiving means.]

[12. The system of claim 9 wherein signal sensing means responsive to an incoming cellular or public telephone network call cause the central processing means to connect the call selectively to a data or voice terminal means associated with the system.]

[13. The system of claim 9 wherein the voice signalling means is a speakerphone built into a case housing the personal computing means.]

[14. The system of claim 9 having means for connecting one or more external voice signal generating and receiving devices which the central processing means may selectively operably connect to either the cellular transceiving means or the public telephone network connection means.]

[15. The system of claim 14 wherein one of the external voice signal generating and receiving devices is a telephone headset.]

[16. The system of claim 14 wherein the central processing means generates all the signals which cause the cellular transceiving means to transmit and receive voice signals over the cellular network.]

[17. The system of claim 14 having sensing means to sense the connective status of the external voice signal generating and receiving devices.]

[18. The system of claim 17 wherein signal sensing means responsive to incoming cellular or public telephone network calls cause these calls to be connected selectively to a data or voice terminal means associated with the system, where the choice of terminal means to be connected depends on the terminal means available and on a preselected priority when a plurality of terminal means are available.]

[19. The system of claim 14 wherein one of the external voice signal generating and receiving devices is a cellular control unit.]

[20. The system of claim 19 including means to selectively control the application of power to the cellular control unit and cellular transceiving means.]

[21. The system of claim 19 wherein the cellular control unit has means for information display or audio signalling, and wherein the central processing means transmit signals to the cellular control unit, causing the control unit to display information or signal audibibly.]

[22. The system of claim 19 wherein the cellular control unit has input means for accepting user input and wherein the central processing means accepts signals from the control unit representative of the user input.]

[23. The system of claim 19 wherein the cellular control unit has a microphone and speaker, and wherein means are provided for selectively transmitting signals from the central processing means to the cellular control unit to enable or disable the microphone and speaker.]

[24. The system of claim 19 wherein the central processing means may control operation of the system such that the cellular control unit functions to transmit and receive signals over the public telephone network while the cellular transceiver is disabled.]

*25. An integrated, hand-held, battery operated cellular telephone and computing device for facilitating voice and data communication over a plurality of public communication networks using different communication protocols, comprising*

*a housing small enough to be hand held;*

*an antenna supported by the housing for transmitting and receiving electromagnetic energy;*

*an integral screen supported by the housing for displaying information that is visually perceptible to a user;*

*memory contained within the housing for storing an operating program and data including network information, telephone numbers and text messages;*

*a touch-sensitive device for receiving user commands and data;*

*network accessing circuitry for accessing one or more of the public communication networks using a protocol appropriate to the communication network accessed to establish a communication link for voice or data communication over the accessed network, the circuitry including a cellular telephone transceiver for sending voice signals and data signals, the network accessing circuitry being electrically connected to the antenna;*

*a processor electrically connected to the screen, memory, touch-sensitive device and network accessing circuitry for responding to user commands for accessing a plurality of public communication networks for sending and receiving both voice signals and data signals wherein at least one network is a cellular telephone network that also provides both voice and data communication capability, the processor operating, under the control of the operating program, to control the cellular telephone and computing device, providing information for display on the screen, carrying out arithmetic calculations and retrieving data from memory;*

*wherein the functions of data processing and placing or receiving telephone calls are combined into a single integrated hand-held unit that allows data processing and network telephone communication to be carried out by selective access, under the control of the processor, to one or more of the public communication networks through operation of the network accessing circuitry.*

*26. The integrated, hand-held, battery operated cellular telephone and computing device of claim 25 having a microphone.*

*27. The integrated, hand-held, battery operated cellular telephone and computing device of claim 25 having a speaker phone.*

*28. The integrated, hand-held, battery operated cellular telephone and computing device of claim 25 wherein the touch sensitive device is a keypad.*

*29. The integrated, hand-held, battery operated cellular telephone and computing device of claim 25 having a speaker.*

*30. The integrated, hand-held, battery operated cellular telephone and computing device of claim 25 wherein the housing includes two rotatably connected parts that permit the configuration of the housing to modified.*

*31. The integrated, hand-held, battery operated cellular telephone and computing device of claim 30, wherein the*

*two rotatably connected parts may be folded together to reduce the overall dimensions of the housing.*

*32. The integrated, hand-held, battery operated cellular telephone and computing device of claim 25, wherein the processor causes operation in one of a plurality of different modes including one mode in which a communication link is established over one communication network and permits a second communication link to be simultaneously established over another communication network.*

*33. An integrated, hand-held, battery operated cellular telephone and computing device for facilitating voice and computer communication over a plurality of public communication networks using communication protocols which differ in the manner by which voice, data or incoming call placement signals are formatted and processed, comprising*

*a housing of an appropriate size to enable the device to be hand held;*

*an antenna connected with the housing for transmitting and receiving electromagnetic energy;*

*an integral display screen connected with the housing for displaying information that is perceptible to a user;*

*memory contained within the housing for storing an operating program and data including network information, telephone numbers and message data;*

*a touch-sensitive device for receiving user commands and data;*

*network accessing circuitry for accessing one or more of the public communication networks using a protocol appropriate to the communication network accessed to establish a communication link for voice or data communication over the accessed network, the circuitry including a cellular telephone transceiver for sending voice signals and data signals, the network accessing circuitry being electrically connected to the antenna;*

*a processor, connected to the screen, memory and touch sensitive device for responding to user commands to provide information for display on the screen, carry out arithmetic calculations and retrieve data from memory;*

*interconnective circuitry for connecting the processor with the network accessing circuitry to allow the processor, operating under program control, to control the network accessing circuitry and to process call placement signals and data signals sent and received over each of the plurality of networks, including the cellular network, using the different communication protocols,*

*wherein the functions of data processing and placing or receiving telephone calls are combined into the housing that allows data processing and network communication to be carried out by selective access, under the control of the processor, to one or more of the public communication networks through operation of the network accessing circuitry.*

*34. The integrated, hand-held, battery operated cellular telephone and computing device of claim 33 having a microphone.*

*35. The integrated, hand-held, battery operated cellular telephone and computing device of claim 33 having a speaker phone.*

*36. The integrated, hand-held, battery operated cellular telephone and computing device of claim 33 having a telephone headset connection.*

*37. The integrated, hand-held, battery operated cellular telephone and computing device of claim 33 having a speaker.*

*38. The integrated, hand-held, battery operated cellular telephone and computing device of claim 33 wherein the housing includes two rotatably connected sections that permit the configuration of the housing to modified.*

*39. The integrated, hand-held, battery operated cellular telephone and computing device of claim 38, wherein the two rotatably connected sections may be folded together to reduce the overall dimensions of the housing.*

*40. The integrated, hand-held, battery operated cellular telephone and computing device of claim 33, wherein the processor causes operation in one of a plurality of different modes including one mode in which a communication link is established over one communication network and permits a second communication link to be simultaneously established over another communication network.*

*41. An integrated, hand-held, battery operated cellular telephone and computing device for facilitating communication over a plurality of public telephone communication networks using different signals for announcing incoming calls, comprising*

*a housing small enough to be hand held;*

*an antenna supported by the housing for transmitting and receiving electromagnetic energy modulated with voice signals and call placement signals;*

*an integral screen supported by the housing for displaying information that is visually perceptible to a user;*

*a touch-sensitive device for receiving user data and commands including user defined preferences for one of a plurality of different ways of being notified that an incoming call placement signal has been received over one of the public communication networks;*

*memory contained within the housing for storing an operating program including software for processing signals announcing incoming calls and for storing user preferences entered via the touch-sensitive device for indicating the manner by which the existence of an incoming call is announced to the user;*

*network accessing circuitry for accessing one or more of the public voice communication networks using a protocol appropriate to the communication network accessed to establish a communication link for communication over the accessed network, the circuitry including a cellular telephone transceiver for sending and receiving voice signals, the network accessing circuitry being electrically connected to the antenna;*

*a processor electrically connected to the screen, memory, touch-sensitive device and network accessing circuitry for responding to incoming call placement signals and user commands indicating the manner in which the user prefers to be notified that an incoming call placement signal has been received to one of the plurality of public communication networks accessible to cause an incoming call announcement of the type preprogrammed by the user to be implemented;*

*wherein the manner by which the user is notified of an incoming call over any one of the networks may be controlled by the processor in accordance with user defined preferences that have been preprogrammed or subsequently reprogrammed by the user and stored in the memory to cause the manner of announcement of an incoming call to suit the current desires of the user.*

*42. The integrated, hand-held, battery operated cellular telephone and computing device of claim 41 having a plurality of different incoming call announcing devices for announcing an incoming call.*

*43. The integrated, hand-held, battery operated cellular telephone and computing device of claim 41, wherein the incoming call announcing devices include a headset.*

*44. The integrated, hand-held, battery operated cellular telephone and computing device of claim 41, wherein the incoming call announcing devices include a speakerphone.*

*45. The integrated, hand-held, battery operated cellular telephone and computing device of claim 41, further including firmware for implementing incoming call announcements in accordance with predetermined priorities.*

*46. The integrated, hand-held, battery operated cellular telephone and computing device of claim 41, wherein the microprocessor generates different types of audio signals for indicating that an incoming call signal has been received.*

*47. The integrated, hand-held, battery operated cellular telephone and computing device of claim 41, a modem for modulating and demodulating data in a format compatible with one or more of the public telephone communication networks.*

*48. An integrated, hand-held, battery operated cellular telephone and computing device for facilitating communication over a plurality of public telephone communication networks using different signals for announcing incoming calls, comprising*

*a housing small enough to be hand held;*

*an antenna supported by the housing for transmitting and receiving electromagnetic energy modulated with voice signals and call placement signals;*

*an integral screen supported by the housing for displaying information that is visually perceptible to a user;*

*a touch-sensitive device for receiving user data and commands including user defined preferences for one of a plurality of different ways of being notified that an incoming call placement signal has been received over one of the public communication networks;*

*memory contained within the housing for storing an operating program including software for processing signals announcing incoming calls and for storing changeable user preferences for announcing the existence of an incoming call;*

*network accessing circuitry for accessing one or more of the public voice communication networks using a protocol appropriate to the communication network accessed to establish a communication link for communication over the accessed network, the circuitry including a cellular telephone transceiver for sending and receiving voice signals, the network accessing circuitry being electrically connected to the antenna;*

*a processor electrically connected to the screen, memory, touch-sensitive device and network accessing circuitry for responding to incoming call placement signals and user commands indicating the manner in which the user prefers to be notified that an incoming call placement signal has been received to one of the plurality of public communication networks to cause an incoming call announcement of the type preprogrammed by the user to be implemented;*

*wherein the manner by which the user is notified of an incoming call over any one of the networks may be controlled by the processor in accordance with user defined preferences that have been preprogrammed or subsequently reprogrammed by the user and stored in the memory to cause the manner of announcement of an incoming call to suit the current desires of the user.*

*49. An integrated, hand-held, battery operated cellular telephone and computing device of claim 48, wherein the incoming call announcing devices include an audible tone generating device.*

*50. An integrated, hand-held, battery operated cellular telephone and computing device of claim 49, wherein the audible tone generating device is a speaker.*

*51. An integrated, hand-held, battery operated cellular telephone and computing device of claim 49, further including a tone generator connected with the audible tone generating device for generating signals for causing the audible tone generating device to generate an audible tone (RING) for indicating an incoming call.*

*52. An integrated, hand-held, battery operated cellular telephone and computing device of claim 51, further including control lines for connecting the processor to the tone generator for supplying control signals representative of a sequence of tones.*

*53. An integrated, hand-held, battery operated cellular telephone and computing device of claim 49, wherein the audible tone generating device is connected with the processor which causes the audible tone generating device to generate an audible signal indicating an incoming call.*

*54. An integrated, hand-held, battery operated cellular telephone and computing device of claim 53, wherein the audible signal is an audible tone (RING).*

*55. An integrated, hand-held, battery operated cellular telephone and computing device of claim 53, wherein the audible signal is generated in response to a series of tones.*

*56. An integrated, hand-held, battery operated cellular telephone and computing device of claim 48, wherein the cellular telephone transceiver responds to transceiver control signals and the processor generates the transceiver control signal.*

*57. An integrated, hand-held, battery operated cellular telephone and computing device of claim 56, wherein the transceiver responds to transceiver control signals generated by the processor without an inverting control unit.*

*58. An integrated, hand-held, battery operated cellular telephone and computing device of claim 25, wherein the cellular telephone transceiver responds to transceiver control signals and the processor generates the transceiver control signal.*

*59. An integrated, hand-held, battery operated cellular telephone and computing device of claim 58, wherein the transceiver responds to transceiver control signals generated by the processor without an intervening control unit.*

*60. An integrated, hand-held, battery operated cellular telephone and computing device of claim 33, wherein the cellular telephone transceiver responds to transceiver control signals and the processor generates the transceiver control signal.*

*61. An integrated, hand-held, battery operated cellular telephone and computing device of claim 60, wherein the transceiver responds to transceiver control signals generated by the processor without an intervening control unit.*

* * * * *